(12) United States Patent
Eekelen et al.

(10) Patent No.: US 12,462,219 B1
(45) Date of Patent: Nov. 4, 2025

(54) DETERMINING REPLENISHMENT OPERATIONS IN PICK AREAS

(71) Applicant: Lineage Logistics, LLC, Irvine, CA (US)

(72) Inventors: René Eekelen, Bergen op Zoom (NL); Daniël Walet, Oakland, CA (US); Jacob Thompson, Truganina (AU); Daniel Thomas Wintz, San Francisco, CA (US)

(73) Assignee: Lineage Logistics, LLC, Irvine, CA (US)

(*) Notice: Subject to any disclaimer, the term of this patent is extended or adjusted under 35 U.S.C. 154(b) by 371 days.

(21) Appl. No.: 18/097,119

(22) Filed: Jan. 13, 2023

Related U.S. Application Data

(60) Provisional application No. 63/299,380, filed on Jan. 13, 2022.

(51) Int. Cl.
*G06Q 10/087* (2023.01)

(52) U.S. Cl.
CPC .................. *G06Q 10/087* (2013.01)

(58) Field of Classification Search
CPC ................................................. G06Q 10/087
USPC .......................................................... 705/28
See application file for complete search history.

(56) References Cited

U.S. PATENT DOCUMENTS

| | | |
|---|---|---|
| 8,918,750 B1 | 12/2014 | Moffitt |
| 9,733,633 B2 | 8/2017 | Wickham et al. |
| 10,489,802 B1 | 11/2019 | Zhdanov et al. |
| 10,504,061 B1 | 12/2019 | Shi |
| 10,796,278 B1 | 10/2020 | Wintz et al. |
| 10,956,858 B2 | 3/2021 | Jahani |
| 11,113,648 B2 | 9/2021 | Willard, III et al. |

(Continued)

FOREIGN PATENT DOCUMENTS

| | | |
|---|---|---|
| CN | 106241168 | 12/2016 |
| CN | 108292381 | 7/2018 |

(Continued)

OTHER PUBLICATIONS

Ariyanti et al., "The integrated method of warehouse layout and labor scheduling to reduce overtime", Proceeding of the International Conference on Industrial Engineering and Operations Management Bandung, 2008-2014, 2018.

(Continued)

*Primary Examiner* — Russell S Glass
(74) *Attorney, Agent, or Firm* — Barnes & Thornburg LLP

(57) ABSTRACT

Disclosed are systems and methods for determining swap and replenishment opportunities in a pick area of a storage facility. A method can include receiving, by a computer system, current stock levels for bays in the pick area, identifying a subset of the bays as having a replenishment or swap opportunity based on determining that the current stock levels for the subset of the bays is less than a threshold stock level, and determining, for each bay in the subset of the bays, whether the bay has a swap opportunity or a replenishment opportunity. The method can also include determining whether each bay is a static bay based on pick area build information, which can include a pick area layout, current SKUs in the pick area, date of layout build, static location assignments for the bays, and dynamic location assignments for the bays.

20 Claims, 10 Drawing Sheets

(56) References Cited

U.S. PATENT DOCUMENTS

| | | | |
|---|---|---|---|
| 11,195,129 | B2 | 12/2021 | Willard, III et al. |
| 11,436,560 | B2 | 9/2022 | Wintz et al. |
| 12,012,283 | B1 * | 6/2024 | Douglas ............... B65G 1/1378 |
| 2005/0229819 | A1 | 10/2005 | Hollander et al. |
| 2009/0082902 | A1 | 3/2009 | Foltz et al. |
| 2010/0164191 | A1 | 7/2010 | Kinnen et al. |
| 2013/0226649 | A1 | 8/2013 | Grissom |
| 2014/0040075 | A1 | 2/2014 | Perry et al. |
| 2014/0343713 | A1 | 11/2014 | Ziegler et al. |
| 2017/0091349 | A1 | 3/2017 | R M et al. |
| 2017/0091704 | A1 | 3/2017 | Wolf et al. |
| 2018/0068255 | A1 | 3/2018 | Hance et al. |
| 2018/0127211 | A1 * | 5/2018 | Jarvis ................... G05D 1/0285 |
| 2019/0213530 | A1 | 7/2019 | Wolf et al. |
| 2020/0034780 | A1 | 1/2020 | Sikka et al. |
| 2021/0150461 | A1 | 5/2021 | Wintz et al. |
| 2021/0150473 | A1 | 5/2021 | Wintz et al. |
| 2022/0366362 | A1 | 11/2022 | Wintz et al. |

FOREIGN PATENT DOCUMENTS

| | | | |
|---|---|---|---|
| CN | 109154799 | | 1/2019 |
| CN | 110059992 | | 7/2019 |
| JP | 2023126793 A | * | 9/2023 ........... B65G 1/0464 |
| WO | WO 2021/102111 | | 5/2021 |

OTHER PUBLICATIONS

Bae, et al., "Acoustic scene classification using parallel combination of lstm and cnn," Proceedings of the Detection and Classification of Acoustic Scenes and Events 2016 Workshop (DCASE2106), 2016, pp. 11-15.

Chen, et al., "Sequencing the storages and retrievals for flow-rack automated storage and retrieval systems with duration of stay storage policy," International Journal of Production Research, 2016, 54(4):984-998.

Chen, et al., "The storage location assignment and interleaving problem in an automated storage/retrieval system with shared storage," International Journal of Production Research, 2010, 48(4):991-1011.

Cho, et al., Learning phrase representations using RNN encoder-decoder for statistical machine translation, CoRR/abs/1406.1078, 2014, 15 pages.

Chung, et al., "Empirical evaluation of gated recurrent neural networks on sequence modeling," arXiv preprint arXiv:1412.3555, 2014, 9 pages.

Donahue, et al., "Long-term recurrent convolutional networks for visual recognition and description," CoRR, abs/1411.4389, 2014, 14 pages.

Dos Santos and Gatti, "Deep convolutional neural networks for sentiment analysis of short texts," Proceedings of COLING 2014, the 25th International Conference on Computational Linguistics: Technical Papers, 2014, pp. 69-78.

Goetschalckx and Ratliff, "Shared storage policies based on the duration stay of unit loads," Management Science, 1990, 36(9):1120-1132.

Hausman, et al., "Optimal storage assignment in automatic warehousing systems," Management Science, 1976, 22(6):629-638.

He, et al., Deep residual learning for image recognition, CoRR, abs/1512.03385, 2015, 12 pages.

International Preliminary Report on Patentability in International Appln. No. PCT/US2020/061235, dated Jun. 2, 2022, 9 pages.

International Search Report and Written Opinion in International Application No. PCT/US2020/061235, dated Mar. 2, 2021.

Jaderberg, et al., "Reading text in the wild with convolutional neural networks," International Journal of Computer Vision, 2016, 116(1):1-20.

Johnson and Zhang, "Effective use of word order for text categorization with convolutional neural networks," arXiv preprint arXiv:1412.1058, 2014, 10 pages.

Johnson and Zhang, "Supervised and semi-supervised text categorization using lstm for region embeddings," arXiv preprint arXiv:1602.02373, 2016, 9 pages.

Kingma and Ba, "Adam: A method for stochastic optimization," arXiv preprint arXiv:1412.6980, 2014, 15 pages.

Kulturel, et al., "Experimental investigation of shared storage assignment policies in automated storage/retrieval systems," IIE Transactions, 1999, 31(8):739-749.

Li et al., "Dynamic storage assignment with product affinity and ABC classification-a case study", The International Journal of Advanced Manufacturing Technology 84(9): 2179-2194, 2015.

Malmborg, "Interleaving models for the analysis of twin shuttle automated storage and retrieval systems," International Journal of Production Research, 2000, 38(18):4599-4610.

Muppani and Adil, "Efficient formation of storage classes for warehouse storage location assignment: A simulated annealing approach," Omega, 2008, 36(4):609-618, Special Issue on Logistics: New Perspectives and Challenges.

Pennington, et al., "Glove: Global vectors for word representation," Empirical Methods in Natural Language Processing (EMNLP), 2014, pp. 1532-1543.

Petersen, et al., "Improving order-picking performance through the implementation of class-based storage," International Journal of Physical Distribution & Logistics Management, 2004, 34(7):534-544.

Rosenblatt and Eynan, "Note-deriving the optimal boundaries for class-based automatic storage-retrieval systems," Management Science, 1989, 35(12):1519-1524.

Schuster and Paliwal, "Bidirectional recurrent neural networks," IEEE Transactions on Signal Processing, 1997, 45(11):2673-2681.

Schwarz, et al., "Scheduling policies for automatic warehousing systems: Simulation results," AIIE Transactions, 1978, 10(3):260-270.

Srivastava, et al., "Dropout: a simple way to prevent neural networks from overfitting," The Journal of Machine Learning Research, 2014, 15(1):1929-1958.

Sutskever, et al., Generating text with recurrent neural networks, Proceedings of the 28th International Conference on Machine Learning (ICML-11), 2011, pp. 1017-1024.

Wang, et al., "End-to-end text recognition with convolutional neural networks," 21st International Conference on Pattern Recognition (ICPR), 2012, IEEE, 3304-3308.

Yu and Koster, "Designing an optimal turnover-based storage rack for a 3d compact automated storage/retrieval system," International Journal of Production Research, 2009, 47(6):1551-1571.

Yu and Koster, "On the suboptimality of full turnover-based storage," International Journal of Production Research, 2013, 51(6):1635-1647.

Yu, et al., "Class-based storage with a finite number of items: Using more classes is not always better," Production and Operations Management, 2015, 24(8):1235-1247.

Zhou, et al., "Text classification improved by integrating bidirectional lstm with two-dimensional max pooling," arXiv breprint arXiv:1611.06639, 2016, 11 pages.

* cited by examiner

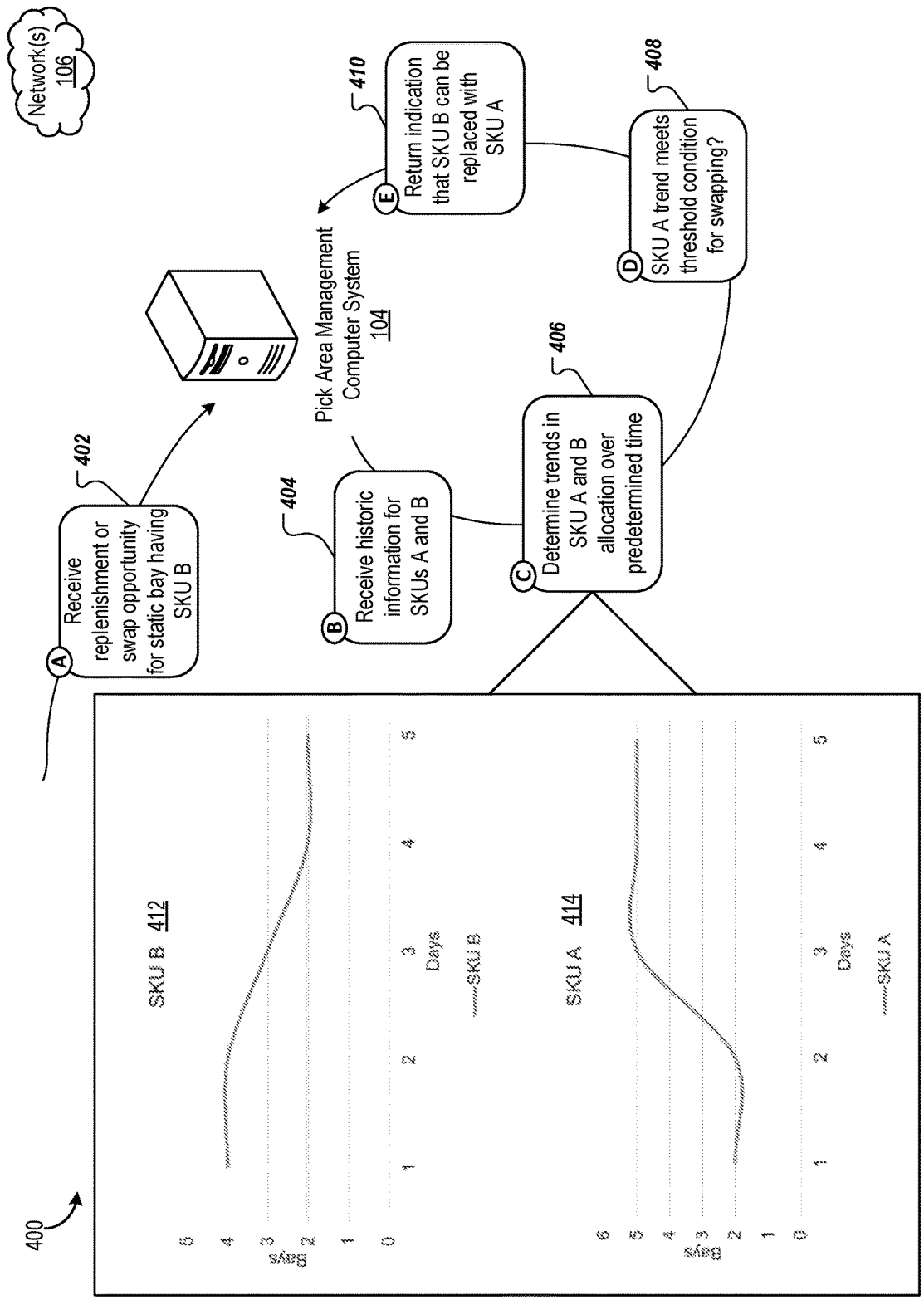

Current Time Period:
Spring

Current SKU in Dynamic Bay: SKU B

Candidate SKU(s): SKU A

Ice cream - SKU A  602

Turkey - SKU B  604

DETERMINING REPLENISHMENT OPERATIONS IN PICK AREAS

CROSS-REFERENCE TO RELATED APPLICATIONS

This application claims priority to U.S. Provisional Patent Application No. 63/299,380, filed on Jan. 13, 2022, which is hereby incorporated by reference in its entirety.

TECHNICAL FIELD

This document generally describes devices, systems, and methods related to managing pick areas in a warehouse environment.

BACKGROUND

Warehouses or other storage facilities receive physical items to be stored for an amount of time before being routed out of the warehouse. The physical items can include pallets, cases, and other items that can be stored before being requested by a customer and transported to another destination location. The physical items can be stored for varying periods of time and under different storage conditions, which can be based on a vendor, customer, or other relevant information. A customer can, for example, request certain items to be picked and shipped to the customer within a certain timeframe. The customer can request items of a same type and/or items of different types. When the customer requests items in a pick order request, the customer can also indicate quantities of each item that are being requested.

When the pick order request is received at the warehouse, warehouse workers can work to fulfill that request. Items that can be picked for pick order requests can be moved to a pick area. Warehouse workers can then pick items in the pick area in order to fulfill the pick order requests. Sometimes, the pick area can store items that may be picked less frequently over time and/or may no longer be requested in pick orders. Some items can, for example, be in high demand during one season and then low demand during a next season. The items can remain in the pick area until they are all picked. Sometimes, the warehouse workers can be tasked with removing all the remaining items in the pick area and replacing them with other items. This can be a time-consuming and energy intensive task. However, leaving the remaining items in the pick area can also cause inefficiencies in the ability of warehouse workers to pick other items to complete other pick order requests on time. Sometimes, the warehouse workers may resort to cherry picking items in storage locations throughout the warehouse because those items are not currently located in the pick area but are being requests in pick order requests.

SUMMARY

The document generally relates to systems and methods for managing pick areas in a warehouse environment or other storage facility. More specifically, this disclosure describes systems for determining when locations in a pick area (e.g., bays) have opportunities to be replenished or swapped with another pallet SKU. The disclosed technology can then determine whether a replenishment or swap opportunity should be performed for the locations in the pick area. The disclosed technology can apply to determining replenishment or swap opportunities for static as well as dynamic locations in the pick area. Static locations can be bays in the pick area that are assigned one or more particular SKUs for some period of time. For example, SKUs that are frequently and consistently picked over a period of time, such as toilet paper, can be assigned to static bays. Warehouse workers can then become accustomed to the particular SKUs being placed in those static locations, thereby making it faster and easier for the warehouse workers to pick that particular SKU when completing pick order requests. Dynamic locations can be bays in the pick area that may not be assigned any particular SKUs but rather can store pallet SKUs that are in high demand during any day or short period of time. For example, SKUs that are in high demand during a particular day, week, month, or sometimes season, can be assigned to the dynamic bays. The dynamic bays can therefore accommodate for fluctuations in demand and volume for any pallet SKU on a day-to-day basis. Warehouse workers can more quickly and efficiently fulfill pick orders that request large volumes of the items that are located in the dynamic bays on a day-to-day basis.

The disclosed technology can provide for different ways to determine a replenishment or swap opportunity based on whether the location in the pick area is static or dynamic. When the location is a static location, the disclosed technology can review historic allocation trends of pallet SKUs that are stored in the warehouse but can be placed in the static location (e.g., candidate SKUs) to determine whether a current pallet SKU in the static location should remain in the location or whether the location can migrate to storing one of the other pallet SKUs. The disclosed technology can compare historic allocation trends of the current pallet SKU to the other pallet SKUs. A variety of factors can be considered to determine whether to swap the current pallet SKU with another pallet SKU for a static location. The factors can include whether a deviation in allocation over time for any of the pallet SKUs is persistent and/or whether the deviation in allocation exceeds a predetermined magnitude.

In scenarios where the deviation in allocation over time is persistent and/or exceeding the predetermined magnitude for another SKU (e.g., allocation for the another SKU suddenly spikes and remains at that constant heightened level for longer than some period of time), the current pallet SKU can be swapped with the other pallet SKU. This can indicate that the other pallet SKU is becoming more popular in pick order requests while the current pallet SKU is can requested less. Since the other pallet SKU is becoming more popular, the other pallet SKU can be slotted in the static location where warehouse workers can more quickly and easily retrieve that pallet SKU to fulfill pick order requests. Thus, the disclosed technology can provide for identifying pallet SKUs in the pick area that can be moved out of the pick area and back into storage when such pallet SKUs are less frequently requested over time, thereby making space for the other pallet SKUs that have higher pick frequencies, velocity, and/or demand. Migrating the static location to the other pallet SKU can provide for a more seamless transition of pallet SKU allocation in the pick area. This type of migration can reduce an amount of time that may otherwise be needed to fully replace pallet SKUs in pick locations, thereby increasing efficiency for warehouse workers to complete pick order requests without interruptions.

Similarly, the current pallet SKU can merely be replenished in the static location when the deviation in allocation of any of the other pallet SKUs is not persistent and/or exceeding the predetermined magnitude. In other words, none of the other pallet SKUs are being requested more often and/or in more quantities as the current pallet SKU.

Therefore, the current pallet SKU can remain in the static location, which can be consistent with historic trends in demand and/or volume of the current pallet SKU.

When the location is a dynamic location, the disclosed technology can provide for determining which pallet SKUs to move into such a location in the pick area. This determination can be based at least in part on historic allocation trends and/or projected future trends that correspond to demand of each pallet SKU that can be placed in the dynamic location. Some pallet SKUs, for example, may be projected to be in high demand during a current time or upcoming time period. This time period can be temporary or short term, such as a day, a couple of days, a week, etc. Pallet SKUs that are projected to be in high demand can be slotted into the dynamic location to accommodate for the upcoming increase in demand and/or volume. The disclosed technology can provide for comparing historic and projected future trends of allocation for a current pallet SKU in a dynamic location and one or more other pallet SKUs that can be positioned in the dynamic location. The disclosed technology can provide for looking back over short (e.g., 2 to 3 months before a current time) and long (e.g., 11 to 9 months before a current time) time periods in order to identify current and future demand for the pallet SKUs. In other words, the disclosed technology provides for projecting future trends of demand for each of the pallet SKUs (the current pallet SKU and pallet SKUs that can be positioned in the dynamic location) using historic information.

When projected future trends of the current pallet SKU exceed projected future trends of other pallet SKUs, for example, a determination can be made that the current pallet SKU can be replenished in the dynamic location. After all, the current pallet SKU is still projected to be in high demand at the current time period and/or during a time period in the near future. To accommodate for such high demand, the current pallet SKU can be replenished in the dynamic location. If, on the other hand and in another example, the projected future trends of the current pallet SKU do not exceed those of one or more other pallet SKUs, a determination can be made that the one or more other pallet SKUs can replace the current pallet SKU in the dynamic location (e.g., a swap). The disclosed technology can also provide for selecting and identifying which of the other pallet SKUs should replace the current pallet SKU in the dynamic location.

Identification of swap and/or replenishment opportunities for both static and dynamic locations in the warehouse can be provided to one or more computing devices. For example, such an identification can be transmitted to a user device used by a warehouse manager and/or a pick area manager. The manager can then review the identification and implement actions that can be taken to update the pick area (e.g., assigning a replenishment or swap task to a warehouse worker, etc.). The identification can also be sent to a warehouse management system, another computing system that builds arrangements or layouts for the pick area, and/or some other cloud service and/or data store. The identification can therefore be used to update the pick area and also to glean insights about efficiency and layout of the warehouse.

One or more embodiments described herein can include a method for determining swap and replenishment opportunities in a pick area of a storage facility, the method including: receiving, by a computer system, current stock levels for bays in the pick area, identifying, by the computer system, a subset of the bays as having a replenishment or swap opportunity based on determining that the current stock levels for the subset of the bays is less than a threshold stock level, determining, by the computer system and for each bay in the subset of the bays, whether the bay has a swap opportunity or a replenishment opportunity, and returning, by the computer system, information about the determined swap opportunity or the determined replenishment opportunity for each bay in the subset of the bays.

The embodiments described herein can optionally include one or more of the following features. For example, the method can include determining, by the computer system, whether each bay in the subset of the bays is a static bay and determining, by the computer system and based on whether the bay is a static bay, whether the bay has a swap opportunity or a replenishment opportunity. Determining, by the computer system, whether each bay in the subset of the bays is a static bay can include receiving, from another computer system, pick area build information and identifying, based on the pick area build information, that the bay is a static bay. The pick area build information can include a pick area layout, current SKUs in the pick area, date of layout build, static location assignments for the bays, and dynamic location assignments for the bays.

The method can also include determining, by the computer system, that the bay is a static bay, identifying, by the computer system, candidate SKUs that can be placed in the static bay, retrieving, by the computer system and from a data store, historic information for the candidate SKUs, determining, by the computer system and based on the historic information for each of the candidate SKUs, deviations in each of the candidate SKUs allocation in static bays over a predetermined time period, determining, by the computer system, whether the deviations in each of the candidate SKUs allocation exceeds a threshold allocation level, identifying, by the computer system, a swap opportunity for the static bay based on the deviation for one or more of the candidate SKUs exceeding the threshold allocation level, identifying, by the computer system, a replenishment opportunity for the static bay based on the deviation being less than the threshold allocation level, and returning, by the computer system, the swap opportunity or the replenishment opportunity for the static bay.

In some implementations, the method can include determining, by the computer system, whether each bay in the subset of the bays is a dynamic bay and determining, by the computer system and based on whether the bay is a dynamic bay, whether the bay has a swap opportunity or a replenishment opportunity. Determining, by the computer system, whether each bay in the subset of the bays is a dynamic bay can include receiving, from another computer system, pick area build information and identifying, based on the pick area build information, that the bay is a dynamic bay.

Moreover, the method can include determining, by the computer system, that the bay is a dynamic bay, identifying, by the computer system, candidate SKUs that can be placed in the dynamic bay, retrieving, by the computer system and from the data store, historic information for the candidate SKUs, determining, by the computer system, historic picking trends for each of the candidate SKUs, projecting, by the computer system and based on the historic picking trends, future picking trends for each of the candidate SKUs, ranking, by the computer system, the candidate SKUs into a list based on the historic picking trends, determining, by the computer system, whether a current SKU in the dynamic bay is ranked above a threshold rank for replenishment of the dynamic bay, identifying, by the computer system, a replenishment opportunity for the dynamic bay based on determining that the current SKU in the dynamic bay is ranked above the threshold rank, identifying, by the computer system, a swap opportunity for the dynamic bay based on determining that the current SKU in the dynamic bay is ranked below the threshold rank, and returning, by the computer system, the swap opportunity or the replenishment opportunity for the dynamic bay.

The method can also include identifying, by the computer system and based on the identified swap opportunity, one of the candidate SKUs that is ranked above the threshold rank and is not yet in a dynamic bay in the pick area and returning, by the computer system, the identified candidate SKU for the swap opportunity of the dynamic bay. Projecting, by the computer system and based on the historic picking trends, future picking trends for each of the candidate SKUs can be based on an average daily pick rate for the candidate SKU over a first time period and a second time period. The first time period can be between three and two months before a current time period and the second time period can be between eleven and nine months before the current time period. The first time period can be within a first threshold amount of time before a current time period and the second time period can be within a second threshold amount of time before the current time period, the first threshold amount of time being less than the second threshold amount of time.

In some implementations, the historic information for the candidate SKUs can include, for each of the candidate SKUs, a quantity of pick locations in the pick area, an average daily pick rate, historic picking trends, and product information. Moreover, the threshold allocation level can be based on a combination of magnitude and consistency of the deviation for each of the candidate SKUs allocation, the magnitude exceeding a threshold magnitude level over a first period of time and the consistency exceeding a threshold duration level over a second period of time.

One or more embodiments described herein can also include a system for determining swap and replenishment opportunities in a pick area of a storage facility, the system can include a pick area including a plurality of bays and a computer system that can be configured to: receive current stock levels for the bays in the pick area, identify a subset of the bays as having a replenishment or swap opportunity based on determining that the current stock levels for the subset of the bays is less than a threshold stock level, determine, for each bay in the subset of the bays, whether the bay has a swap opportunity or a replenishment opportunity, and return information about the determined swap opportunity or the determined replenishment opportunity for each bay in the subset of the bays.

In some implementations, the system can optionally include one or more of the following features. For example, the computer system can also determine whether each bay in the subset of the bays is a static bay and determine, based on whether the bay is a static bay, whether the bay has a swap opportunity or a replenishment opportunity. Determining whether each bay in the subset of the bays is a static bay can include receiving, from another computer system, pick area build information and identifying, based on the pick area build information, that the bay is a static bay. Moreover, the pick area build information can include a pick area layout, current SKUs in the pick area, date of layout build, static location assignments for the bays, and dynamic location assignments for the bays. In some implementations, the computer system can also determine that the bay is a static bay, identify candidate SKUs that can be placed in the static bay, retrieve, from a data store, historic information for the candidate SKUs, determine, based on the historic information for each of the candidate SKUs, deviations in each of the candidate SKUs allocation in static bays over a predetermined time period, determine whether the deviations in each of the candidate SKUs allocation exceeds a threshold allocation level, identify a swap opportunity for the static bay based on the deviation for one or more of the candidate SKUs exceeding the threshold allocation level, identify a replenishment opportunity for the static bay based on the deviation being less than the threshold allocation level, and return the swap opportunity or the replenishment opportunity for the static bay. Moreover, the computer system can determine whether each bay in the subset of the bays is a dynamic bay and determine, based on whether the bay is a dynamic bay, whether the bay has a swap opportunity or a replenishment opportunity.

The devices, system, and techniques described herein may provide one or more of the following advantages. For example, the disclosed technology provides for more efficient use of computing resources. The disclosed technology can be faster and lighter to process and execute based on using a variety of factors associated with historic trends of pallet SKUs and pick area build information. Using the historic trends and pick area information can be advantageous to more insightfully and efficiently determine replenishment and/or swap operations for static and dynamic locations in the pick area. Moreover, the disclosed technology can make such determinations without having to wait to receive pick order requests from a warehouse management system or other computing system. The disclosed technology can therefore be more efficient and quick in determining whether to replenish or swap pallet SKUs in the pick area in order to keep up with changing demand.

Moreover, the disclosed technology can provide for projecting future allocation trends in order to slot pallet SKUs in dynamic locations before they are increasingly requested in pick orders. This can improve overall efficiency of the warehouse since the warehouse can seamlessly keep up with fluctuations in demand without down time that may result from having to pick pallet SKUs that are not in the pick area when requested. Pick order requests may not be received in advance, thereby making it challenging to know what pallet SKUs may be requested and in high demand. As a result, pick areas may not be stocked with pallet SKUs that are requested and in high demand until the pick order requests are received, which can reduce efficiency in completing the pick order requests. The disclosed technology, on the other hand, provides for identifying replenishment or swap opportunities based on identifying what pallet SKUs may be requested and in high demand in the future. The disclosed technology can provide for looking back at historic allocation trends in the short term (e.g., 3 to 2 months out) and long term (e.g., 12 to 11 months out). The disclosed technology can use these historic trends to look forward in time and project future allocation trends for the pallet SKUs. This can be an effective way to project what pallet SKUs may be in high demand and therefore which pallet SKUs can be allocated to the dynamic locations. As a result, the pick area can be prepped with the pallet SKUs that are or will be in high demand to improve efficiency in completing pick order requests and keeping up with changing demand.

Similarly, the disclosed technology can provide for making immediate replenishments of dynamic locations in the pick area. Dynamic locations can be filled with items that are in high demand and/or requested in large quantities. Projecting future trends for items based on looking back over the short and long terms can be advantageous to determine which SKUs and quantities of such SKUs to slot in the dynamic locations. Pallet SKUs that are projected to be in high demand can be slotted in the dynamic locations. Warehouse workers can complete pick orders with high demand pallet SKUs more efficiently and/or in less time since the high demand pallet SKUs can be stored in larger volumes in the dynamic locations.

As another example, the disclosed technology can provide for performing gradual changes or updates to the pick area. Once a static or dynamic location is identified as having a quantity of a particular pallet SKU below a threshold level, the disclosed technology can identify this as an opportunity to replenish that location with the particular pallet SKU or to gradually fill that location with another pallet SKU. For example, typically replacing one pallet SKU in a static location with another pallet SKU can be time-consuming and labor intensive. It can require warehouse workers to remove all of the remaining items of a current pallet SKU from the static location and place items of another pallet SKU therein. The disclosed technology, on the other hand, can provide for gradually filling space that opens up in the static location with the other pallet SKU. Therefore, once any remaining quantities of the current pallet SKU are fully depleted in the static location, the static location would be fully migrated to the other pallet SKU. This gradual and seamless migration can require less time and energy resources than doing a sudden, complete flip of pallet SKUs. After all, the other pallet SKU can slowly be slotted in the static location over time. This migration can also occur at a rate that corresponds to a projected rate of demand for the other pallet SKU. In other words, if the other pallet SKU is projected to be requested in large quantities, than more of the empty space in the static location can be filled with the other pallet SKU. As a result, by a time the other pallet SKU reaches a consistent and/or increased level of demand, enough of the other pallet SKU may already be stored in the static location to keep up with the demand. The other pallet SKU may therefore not require mid shift drops to ensure that the static location has a sufficient quantity of the other pallet SKU to fulfill the pick order requests. Warehouse efficiency can be maintained and/or improved as the pick area gradually transitions to different layouts that accommodate for changes in demand for different pallet SKUs.

Likewise, the disclosed technology can provide for updating allocation of pallet SKUs in the pick area to avoid cherry picking. Cherry picking can occur when warehouse workers have to go into storage locations in the warehouse to select odd quantities of pallet SKUs to fulfill pick order requests. Those pallet SKUS may, for example, not be slotted in pick area locations. The disclosed technology can be advantageous to reduce a possibility that warehouse workers may have to go into storage locations in the warehouse to select pallet SKUs. Based on analysis of historic trends and projecting future trends, the disclosed technology can determine which pallet SKUs are likely to be picked. For example, with regards to static locations, pallet SKUs may be likely picked if, over a predetermined period of time, demand for such pallet SKUs is consistent and/or increasing to or above a certain magnitude. Pallet SKUs that are likely to be picked can be slotted in the static locations. As such pallet SKUs are requested in pick orders, the warehouse workers can pick these pallet SKUs from the static locations instead of having to cherry pick such pallet SKUs in storage locations throughout the warehouse. By the time such pallet SKUs reach peak demand, the static locations can be fully migrated to accommodate for these pallet SKUs. Warehouse workers can therefore keep up with the demand for such pallet SKUs and may not have to resort to cherry picking. This increases overall warehouse efficiency and improves the warehouse's ability to complete pick order requests on time and/or ahead of schedule.

The details of one or more implementations are set forth in the accompanying drawings and the description below. Other features and advantages will be apparent from the description and drawings, and from the claims.

BRIEF DESCRIPTION OF THE DRAWINGS

FIG. 4A is a conceptual diagram of a process for swapping pallet SKUs in a static bay in the pick area.

Like reference symbols in the various drawings indicate like elements.

DETAILED DESCRIPTION OF ILLUSTRATIVE EMBODIMENTS

This document relates to systems and methods for managing a pick area layout in a warehouse environment or other storage facility. The disclosed technology can provide for identifying replenishment or swap opportunities in pick locations (e.g., bays) in the pick area. When such opportunities are identified, the disclosed technology can identify whether the bay is a static or dynamic pick bay. Static bays can be assigned one or more pallet SKUs that are consistently requested in pick orders. Dynamic bays can be assigned one or more pallet SKUs that ebb in demand and volume requested. For example, some days or some seasons, one product, such as ice cream, can be in high demand while another product, such as turkeys, may be in low demand. To accommodate for such fluctuations in demand, the ice cream can be slotted in the dynamic bay(s) during the high demand season(s).

If the bay is static, the disclosed technology can provide for identifying whether to replenish or swap out a current pallet SKU in that bay. This determination can be made based on historic allocation trends associated with the current pallet SKU and one or more other SKUs that can be slotted in the static bay. If the bay is dynamic, the disclosed technology can provide for identifying whether to fill the bay with a current pallet SKU or another pallet SKU. This determination can be made based on looking back over short and long time periods to project future trends in demand for each of the SKUs. A pallet SKU that is projected to peak in demand can therefore be slotted in the dynamic bay.

Figure 1:
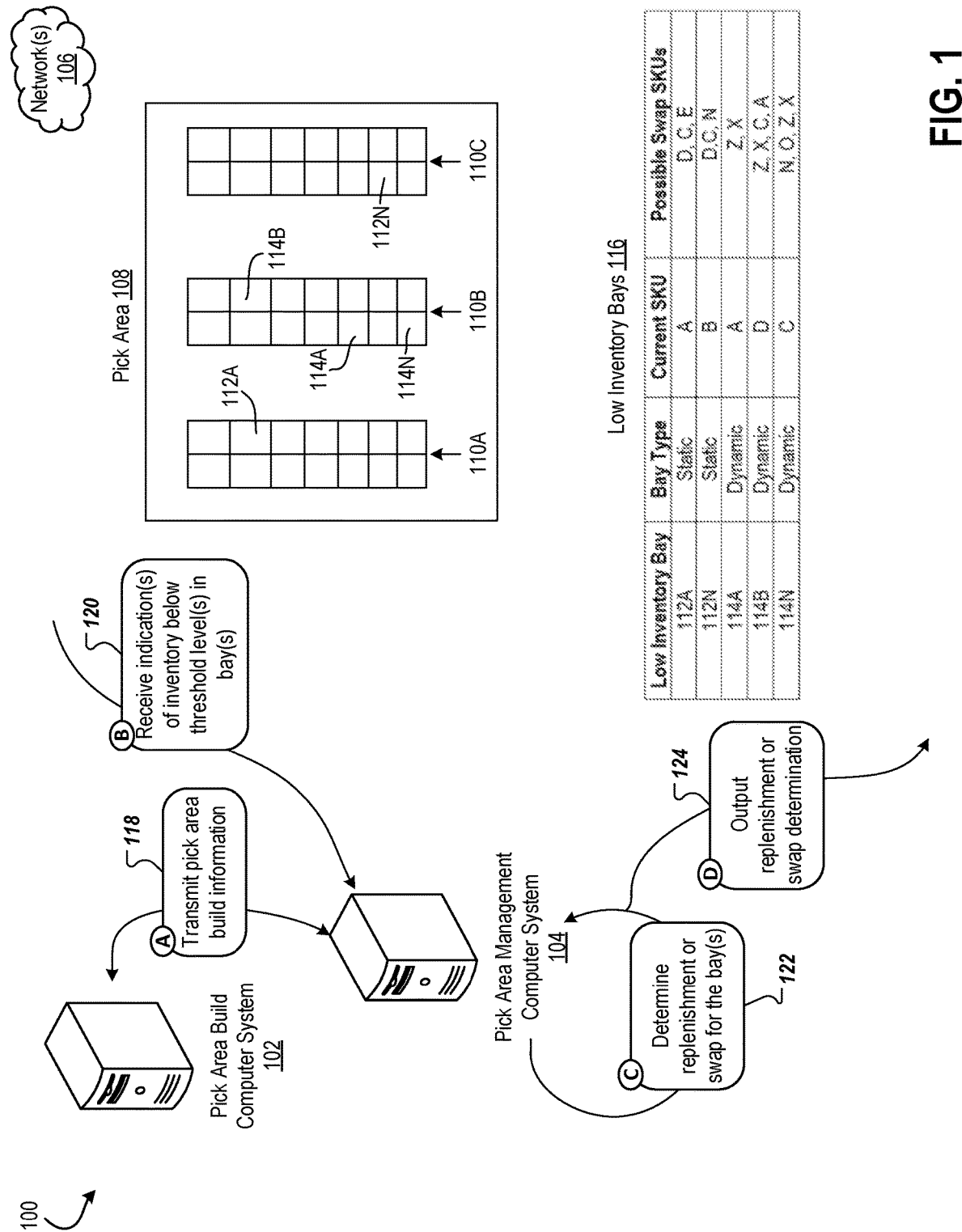
FIG. 1 is a conceptual diagram for identifying replenishment or swap opportunities in a pick area of a warehouse environment.

Referring to the figures, FIG. 1 is a conceptual diagram for identifying replenishment or swap opportunities in a pick area 108 of a warehouse environment 100. A pick area build computer system 102 and a pick area management computer system 104 can be in communication via network(s) 106. The computer systems 102 and 104 can be configured to perform techniques described herein to improve arrangement and management of the pick area 108 of the warehouse environment 100.

Warehouses or other storage facilities can include areas where pallets of items can be picked to fulfill pick order requests. For example, when a warehouse receives pick order requests from customers, warehouse workers can pick the requested items off pallets that have been moved from storage to a pick area, such as the pick area 108 depicted in FIG. 1. Pallets of items can be moved to and from the pick are based on demand for the items over time. For example, during summer months, pallets of ice cream can be moved to the pick area since ice cream is frequently ordered during the summer months. During the winter, the pallets of ice cream can be replaced by other high demand items in the pick area. The pick area can be dynamically adjusted to accommodate for changes in demand and other characteristics of the warehouse environment. For example, pick aisles (e.g., pick lines) can be added or removed from the pick area. When the pick area is expanded in size, an amount of storage space in the warehouse can be reduced. On the other hand, when the pick area is reduced in size, the amount of storage space in the warehouse can be increased.

Still referring to FIG. 1, the pick area build computer system 102 can be configured to determine an optimal arrangement for the pick area 108. For example, the pick area build computer system 102 can determine how many aisles to include in the pick area 108, how long to make the aisles, what pallets should go into the aisles in the pick area 108, how many static and/or dynamic bays (e.g., locations) to assign to each pallet SKU in the pick area 108, and/or whether to group together the static and/or dynamic bays assigned to each pallet SKU.

The pick area management computer system 104 can be configured to determine when stock is low in the pick area 108. The computer system 104 can also determine, when stock is low, whether the pallet SKU in the static or dynamic bay having the low stock should be replenished or swapped with other pallet SKUs. This determination can be different based on whether the bay with the low stock is dynamic or static, as described further below. For example, the pick area management computer system 104 can determine when dynamic bays open up and whether they should be replenished with a current pallet SKU or replaced/swapped with another pallet SKU. Such a determination can be made based on looking back at historic picking trends for the current pallet SKU and candidate pallet SKUs. Looking back provides for the pick area management computer system 104 to project, going forward, what pallet SKUs will be popular and should be slotted in the dynamic bays. The pick area management computer system 104 can also handle migration of pallet SKUs in static bays such that static bays can seamlessly transition from storing one pallet SKU to storing another pallet SKU over one or more time periods (e.g., 90 days). The pick area management computer system 104 can look at historic picking trends over one or more time periods to determine whether the trends are consistent enough to warrant beginning a migration or transition of one pallet SKU to another pallet SKU in the static bay(s).

The pick area build computer system 102 can transmit pick area build information to the pick area management computer system 104 (step A, 118). Sometimes, the pick area management computer system 104 can request the build information. For example, the pick area management computer system 104 can request the build information at predetermined times, such as every predetermined number of minutes, hours, and/or days. Sometimes, the pick area build computer system 102 can transmit the build information at predetermined times, such as whenever the pick area build computer system 102 determines an arrangement or modified arrangement for the pick area 108.

The pick area build information can include information about an arrangement and layout of the pick area 108. In FIG. 1, the pick area 108 has three pick aisles 110A, 110B, and 110C. Each of the pick aisles 110A-C also have a plurality of bays that can be static and/or dynamic, as determined by the pick area build computer system 102. The pick area build information can also include information about pallet SKUs that can be or are currently positioned in the pick area 108. For example, the information can include average daily pick rates of the pallet SKUs, types of products, weight per pallet, which bays the pallet SKUs are assigned to, how many bays each pallet SKU is assigned, etc. The pick area management computer system 104 can use this information in order to make determinations about how to manage replenishment and/or swapping of pallet SKUs in the pick area 108.

The pick area management computer system 104 can also receive indication(s) of inventory below threshold levels in one or more of the bays in the pick area 108 (step B, 120). These indications can be received from a warehouse management system (WMS) of the warehouse environment 100. These indications can also be received from one or more computing devices used by warehouse workers. For example, warehouse workers can be tasked with reviewing stock levels in the pick area 108 at predetermined times. The warehouse workers can therefore provide indications to the pick area management computer system 104 about which bays in the pick area 108 are currently low in inventory/stock.

Each pallet SKU in the pick area 108 can have a different threshold level to be considered low in inventory/stock. For example, pallets of TVs can take up more space in bays in the pick area 108 than pallets of hand lotion. Bays that store the pallets of TVs may therefore be considered low in inventory when only a few pallets are emptied out in comparison to the bays that store the pallets of hand lotion. Thus, the threshold level of low inventory for pallets of TVs can be lower than the threshold level of low inventory for pallets of hand lotion. The threshold levels of low inventory can also vary depending on demand, frequency of being picked, and other characteristics specific to each pallet SKU in the pick area 108.

The indications of low inventory (step B, 120) can be received at a same time as the pick area build information (step A, 118). The indications of low inventory can also be received at an earlier or later time than the pick area build information.

The pick area management computer system 104 can then determine whether to replenish or swap pallet SKUs in the bays that have inventory below the threshold levels (step C, 122). This determination can be made based on the pick area build information and the indications of low inventory. For example, the indications of low inventory can include information about pick order requests that are queued up for the pick area 108. This information can include a type of the pick order requests, data on sets of build steps for each of the pick order requests (e.g., location names where pallets are that need to be picked from, location coordinates of the pallet's locations, a number of items to be picked, identifiers of the pallets to pick from), data on replenishment and/or reverse replenishment moves in full pallet moves task queues and/or current tasks being executed by warehouse workers, data about pallets that are currently in the pick area 108 (e.g., location name(s), depth in multi-deep locations, owner/customer code, item code, measurements, quantity remaining on the pallet, temperature zone), and/or data about all bays in the pick area 108 (e.g., location names, coordinates, bay, level, temperature zone, maximum height, maximum weight, velocity percentile, frequency that warehouse workers go to that location, location capacity, set of pallets currently in the location).

The determination made in step C can also be made or otherwise triggered whenever new tasks are added to a queue of pick order requests and/or when one or more pick order requests are completed. As described further below, this determination can be different depending on whether the bays having low inventory are static or dynamic bays (e.g., refer to FIGS. 3-4 for static bays and FIGS. 5-6 for dynamic bays).

The pick area management computer system 104 can then output the replenishment or swap determination (step D, 124). The output can include replenishment opportunities for one or more of the bays having low inventory in the pick area 108. The output can also include, for each bay that is identified as having a replenishment opportunity, a location name, owner/customer code, and/or item code that can be used to identify which pallets in storage to use to replenish the bays in the pick area 108. The output can include indications of which pallets to move from the pick area 108 back into storage in the warehouse environment 100. The output can also include indications of which pallet SKUs to swap in which bays and which pallet SKUs to fill in open spots in the pick area 108. As mentioned above, the output can include, for each bay that is identified as having open spots to fill, a target location name, owner/customer code, and/or item code.

Outputting can include storing the determination in a warehouse data store. Outputting can include transmitting the determination to the WMS. Outputting can also include transmitting the determination to one or more user computing devices. For example, the determination can be transmitted to a computing device (e.g., mobile phone, laptop, tablet, computer, smartphone, etc.) of a warehouse facility manager. The warehouse facility manager can use the determination in order to modify or otherwise update the arrangement of pallet SKUs in the pick area 108.

In FIG. 1, the pick area 108 has several bays that are indicated as low inventory. For example, bay 112A in the pick aisle 110A is a static bay that has low inventory. Bay 112N in the pick aisle 110C is also a static bay that has low inventory. Bays 114A-N in the pick aisle 110B are dynamic bays that have low inventory. When the pick area management computer system 104 determines whether to replenish or swap pallet SKUs in the bays 112A-N and 114A-N, the pick area management computer system 104 can identify low inventory bays 116. The pick area management computer system 104 can identify a bay type for each of the low inventory bays, a current SKU in each of those bays, and possible pallet SKUs that can be swapped with the current SKU in each of those bays. In FIG. 1, for example, low inventory bay 112A is a static bay, currently has pallets of SKU A, and can be potentially swapped with pallets of SKUs D, C, and/or E. Bay 112N is also a static bay, currently has pallets of SKU B, and can be potentially swapped with pallets of SKUs D, C, and/or N. Bay 114A is a dynamic bay, currently has pallets of SKU A, and can potentially be swapped with pallets of SKUs Z, and/or X. Bay 114B is a dynamic bay, currently has pallets of SKU D, and can potentially be swapped with pallets of SKUs Z, X, C, and/or A. Finally, bay 114N is also a dynamic bay, currently has pallets of SKU C, and can potentially be swapped with pallets of SKUs N, O, Z, and/or X.

As will be described further below, the pick area management computer system 104 can make determinations about whether to swap or replenish any of the bays 112A-N and 114A-N. For example, the pick area management computer system 104 can determine that pallet SKU A should be replenished in the static bay 112A because demand for pallets of SKU A has remained consistent over a predetermined period of time in comparison to pallets of SKUs D, C, and E. As another example, the pick area management computer system 104 can determine that in the dynamic bay 114N, pallets of SKU C should be swapped out with pallets of SKU X because pallets of SKU X are projected to be in more demand than pallets of SKU C.

Figure 2:
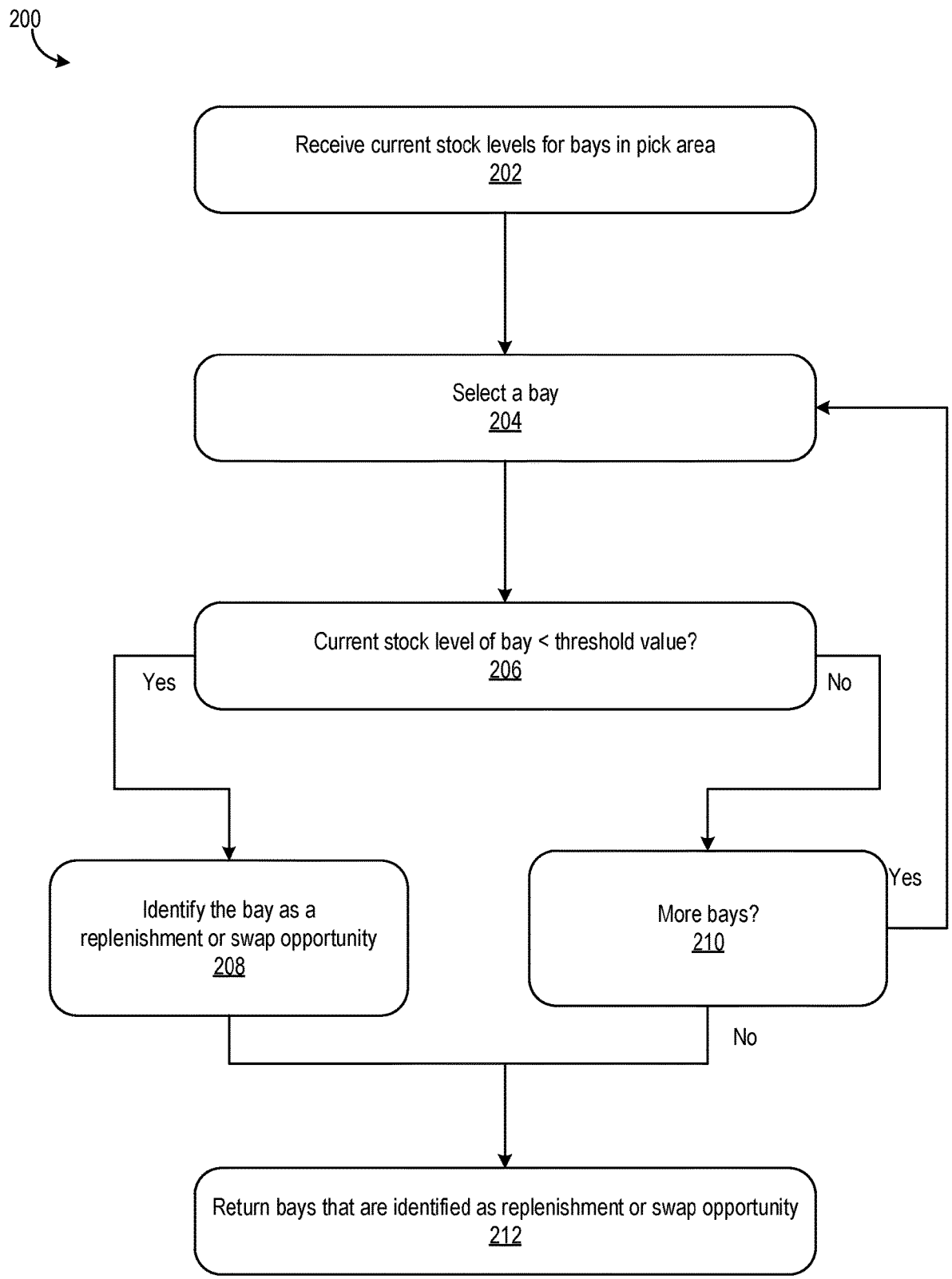
FIG. 2 is a flowchart of a process for determining when a replenishment or swap opportunity exists for a bay in the pick area.

FIG. 2 is a flowchart of a process 200 for determining when a replenishment or swap opportunity exists for a bay in the pick area. The process 200 can be performed regardless of whether the bay is static or dynamic. As described herein, at some point, levels of inventory in bays in the pick area can fall below a certain point, which creates an opportunity to replenish or swap the inventory in the bays. The process 200 can be advantageous to manage which pallet SKUs are stocked in the pick area in order to keep up with pick order requests and demand. The process 200 can provide for opportunities to migrate pallet SKUs that are stored in the pick area over time, thereby making the transition more seamless, easier to manage, and more in line with changes in the warehouse environment.

The process 200 can be performed by the pick area management computer system 104 of FIG. 1. The process 200 can also be performed by one or more other computing systems, servers, devices, and/or network of computers. For illustrative purposes, the process 200 is described from the perspective of a computer system.

Referring to the process 200 in FIG. 2, the computer system can receive current stock levels for bays in the pick area in 202. For example, as described in reference to FIG. 1, the computer system can receive current stock levels from a warehouse management system (WMS). The computer system can poll the WMS to receive current stock levels in the pick area of the warehouse environment. Moreover, the computer system can receive current stock levels from the WMS at predetermined times, such as every few minutes, every day, etc. The computer system can receive current stock levels for all pallet SKUs in the pick area. Sometimes, the computer system can receive current stock levels for only some of the pallet SKUs in the pick area.

The computer system can then select one of the bays in 204. The computer system can determine whether the current stock level for the selected bay is less than a threshold value (206). The threshold value can be the same for all bays in the pick area. For example, the threshold value can be 10 pallets. The threshold value can be different for each of the pallet SKUs. The threshold value can be based on size of each pallet SKU, demand for each pallet SKU, and other information about each of the pallet SKUs. The threshold value can also be based on a size of the pick area, a size of the bays, and/or other information about the build and arrangement of the pick area. Moreover, the threshold value can be based on current pick order requests that are received at the warehouse.

If the current stock level for the selected bay is less than the threshold value, the computer system can identify the bay as having a replenishment or swap opportunity in 208. In other words, the computer system can determine that because the bay is low on inventory, the bay can be either replenished or swapped with other pallet SKUs. In the example where the threshold value is 10 pallets, if the selected bay has less than 10 pallets, then the selected bay can be identified as having a replenishment or swap opportunity.

This presents an opportunity to change arrangement of pallet SKUs in the pick area to keep up with changing demand in pick order requests at the warehouse. Moreover, this presents an opportunity to transition pallet SKUs in the pick area without requiring a complete change of pallet SKUs at once. It can be preferred to make a gradual motion of changing pallet SKUs in the pick area in between pick order requests to provide for more efficient updating of the pick area without compromising on the ability of warehouse workers to complete the pick order requests on time. Additionally, the less current stock in the selected bay, the less energy that would be needed to move remaining pallet SKUs in the selected bay to replenish or fill the selected bay with pallet SKUs. Therefore, it can be preferred in some implementation to have a lower threshold level such that less time, energy, and other resources may be used to replenish or swap pallets in the selected bay. The computer system can then proceed to block 212.

If the current stock level for the selected bay is greater than the threshold value, then the selected bay may not have a replenishment or swap opportunity at the moment. For example, the selected bay can be primarily full, such as being over 50% filled with pallets of a particular SKU or multiple SKUs. The fuller the selected bay is, the more energy, time, and other resources it can take to rearrange the selected bay with a replenishment or swap of other pallet SKUs. Therefore, the selected bay may not currently have a replenishment or swap opportunity.

Accordingly, when the current stock level is greater than the threshold value, the computer system can determine whether there are more bays in 210. If there are more bays, then the computer system can return to block 204 and repeat blocks 204-210 until there are no more bays to analyze for a replenishment or swap opportunity. If there are no more bays in 210, then the computer system can proceed to block 212.

In 212, the computer system can return bays that are identified as having a replenishment or swap opportunity. The computer system can store indications of the bays having the replenishment or swap opportunity in a warehouse data store or other data store. The computer system can also transmit indications of the bays having the replenishment or swap opportunity to another device, such as a user computing device or other computing device of one or more warehouse workers. Moreover, indications of the bays having the replenishment or swap opportunity can be used by the computer system in one or more other process described below (e.g., refer to FIG. 3).

Figure 3:
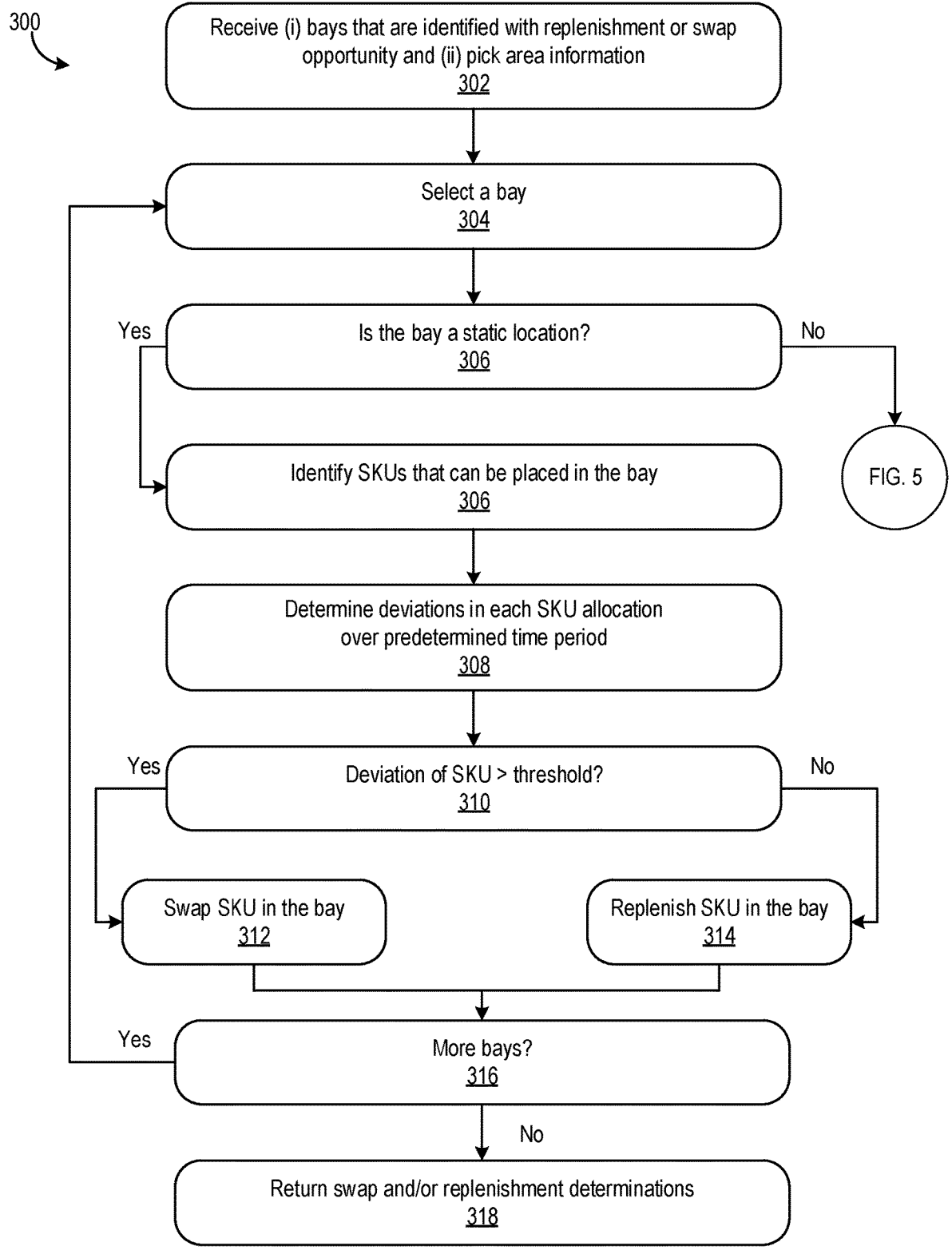
FIG. 3 is a flowchart of a process for determining whether to replenish or swap pallet SKUs in a static bay in the pick area.

FIG. 3 is a flowchart of a process 300 for determining whether to replenish or swap pallet SKUs in a static bay in the pick area. As described throughout this disclosure, replenishment and swap determinations can be different based on whether the bay is static or dynamic. For static bays, whether to replenish or swap pallet SKUs can hinge on assessing velocity or demand for the pallet SKUs over a predetermined historic period of time.

The process 300 can be performed by the pick area management computer system 104 of FIG. 1. The process 300 can also be performed by one or more other computing systems, servers, devices, and/or network of computers. For illustrative purposes, the process 300 is described from the perspective of a computer system.

Referring to the process 300, the computer system can receive (i) bays that are identified as having a replenishment or swap opportunity (e.g., refer to the process 200 in FIG. 2) and (ii) pick area information (302). The pick area information can be specific to the bays that are identified as having a replenishment or swap opportunity. For example, for each bay that is identified in (i), the pick area information can include a quantity of a particular pallet SKU in the bay and/or possible pallet SKUs that can replace the pallet SKU in the bay. As described in reference to FIG. 1, the pick area information can also include information about a layout of the pick area, including a current arrangement of the pick aisles and locations of pallet SKUs in each of the bays in the pick area.

The computer system can then select a bay in 304. The computer system can determine whether the selected bay is a static location. For example, the pick area information can indicate which bays are static locations and which are dynamic locations. The computer system can also communicate with a warehouse management system (WMS) to determine whether the bay is static or dynamic. If the bay is not static, then it is dynamic, and the computer system can perform process 500 in FIG. 5.

If the bay is static, then the computer system can identify SKUs that can be placed in the selected bay in 306. For example, the computer system can, using the pick area information, identify which possible SKUs can be slotted in the selected bay. The possible SKUs can be SKUs that are not currently slotted in the pick area. The possible SKUs can include SKUs that are currently slotted in the pick area and, for example, in low stock in one or more bays in the pick area. Determining which possible SKUs can be slotted in the selected bay can depend on a variety of factors including but not limited to (i) what SKUs are requested in current or recent pick order requests, (ii) historic picking trends for the SKUs, (iii) whether the SKUs are currently in the pick area or whether they are in storage, (iv) weight per pallet of each SKU and how much weight capacity is available in the selected bay, (v) dimensions/size/space needed for each pallet of each SKU and the available dimensions/size/space in the selected bay, and whether each SKU requires cold storage.

Figure 4B:
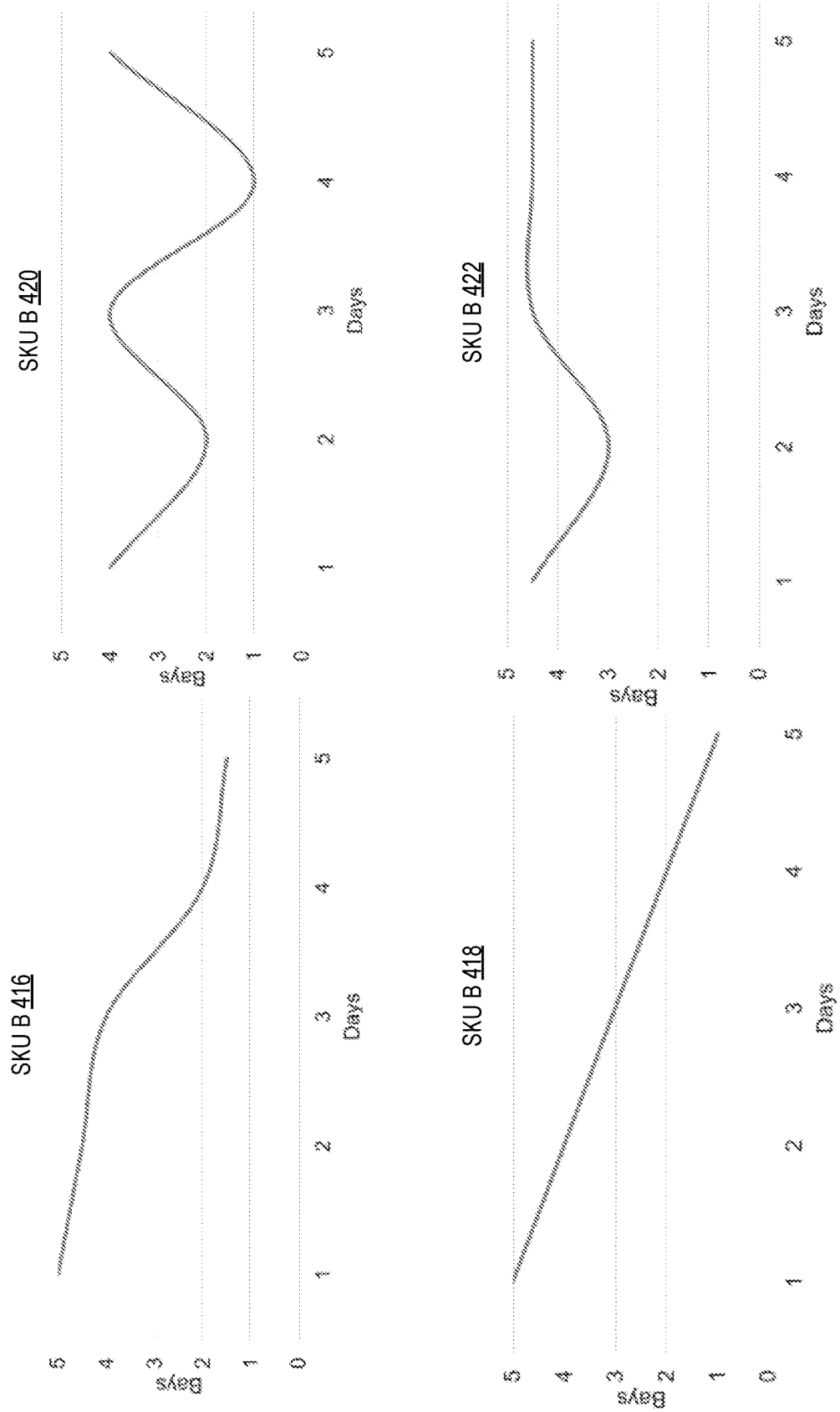
FIG. 4B demonstrates graphical depictions of example replenishment and swap opportunities for the static bay in the pick area of FIG. 4A.

The computer system can then determine deviations in each SKU allocation over a predetermined time period in 308. For example, the predetermined time period can be 5 days. The computer system can look back over the past 5 days at picking rates (e.g., velocity, demand) for each of the SKUs that can be slotted in the selected bay, including the pallet SKU currently in the selected bay. The deviations in each SKU allocation can therefore indicate, over the past 5 days, whether the SKU was in high demand, normal demand, less demand, whether the SKU was picked frequently or less frequently, and/or whether the SKU was picked in larger quantities or smaller quantities. The deviations in each SKU allocation can be graphed or otherwise visualized, as depicted in FIGS. 4A-B. The deviations in each SKU allocation can be used to determine whether there was enough significant change in demand for a particular SKU to warrant slotting that SKU in the selected bay.

Accordingly, the computer system can determine whether the deviation for each SKU exceeds a threshold condition in 310. The threshold condition can be a combination of factors. The threshold condition can also be one condition. For example, the threshold condition can be a predetermined level of magnitude and consistency in deviation. Therefore, if the deviation for any particular SKU is both great in magnitude and is consistent over a predetermined amount of time (e.g., the 5 day time period mentioned above or 3 out of the 5 days in the predetermined time period), then the computer system can determine that the particular SKU should be slotted in the selected bay. After all, the particular SKU can be increasingly demanded in pick order requests and to keep up with this consistent increased demand, the particular SKU can be slotted in the selected bay. Therefore, warehouse workers can more efficiently complete pick order requests that include the particular SKU without causing delays in completing the pick order requests. The threshold condition can be only a predetermined level of magnitude in deviation. The threshold condition can, sometimes, be only a predetermined level of consistency in deviation. In yet some implementations, one or more other factors can act as threshold conditions.

If the deviation for any of the SKUs exceeds the threshold condition, then the computer system can determine that the SKU in the selected bay can be swapped (312). The computer system can compare the deviation for the other SKUs to the deviation of the SKU currently in the selected bay. Thus, if the SKU currently in the selected bay is being demanded less in pick orders over the predetermined time period while another SKU is being demanded more over the predetermined time period, then the computer system can determine that the SKU currently in the selected bay can be swapped with the other SKU. The computer system can then proceed to block 316.

If the deviation for any of the SKUs does not exceed the threshold condition, then the computer system can determine that the SKU in the selected bay can be replenished in 314. For example, the SKU currently in the selected bay may be demanded at a consistent rate over the predetermined time period or the demand for that SKU can be fluctuating and inconsistent over the predetermined time period. In both scenarios, it can be preferred to keep the SKU currently in the selected bay and replenish that SKUs quantity. The computer system can then proceed to block 316.

In 316, the computer system can determine whether there are more bays that have been identified as having a replenishment or swap opportunity. If there are more bays, then the computer system can return to block 304 and repeat blocks 304-316 until there are no more bays to analyze.

If there are no more bays to analyze in 316, then the computer system can return swap and/or replenishment determinations for each of the bays in 318. For example, the computer system can return indications of which bays that are static can be swapped and which static bays can be replenished. These indications can be stored in a warehouse data store or other data store. These indications can also be transmitted to another computer system and/or computing device, such as a mobile device of a warehouse worker. The warehouse worker can, for example, use these indications to implement one or more changes in the pick area. For example, the warehouse worker can decide to swap a SKU in a static bay with another SKU, based on the computer system's recommendation. The warehouse worker or another computer system can also generate one or more tasks to implement one or more of the swap and/or replenishment determinations for the static bays in the pick area.

FIG. 4A is a conceptual diagram of a process 400 for swapping pallet SKUs in a static bay in the pick area. The process 400 is also described in reference to the process 300 in FIG. 3 above. The process 400 can be performed by the pick area management computer system 104 of FIG. 1. The process 400 can also be performed by one or more other computing systems, servers, devices, and/or network of computers.

The process 400 can be performed in such a way that is not reactionary to infrequent or inconsistent changes in SKU demand. In other words, whenever there is a change in demand from one day to a next with regards to a particular SKU, the pick area management computer system 104 may not immediately determine that a swap must occur. Rather, the pick area management computer system 104 can identify threshold, consistent deviations that warrant or otherwise trigger swapping SKUs. The pick area management computer system 104 can identify deltas in a current static layout of the pick area over time to determine whether those deltas are persistent enough to warrant a swap. Sometimes, a delta can be sufficient to warrant a swap when the delta occurs over a predetermined number of consecutive days. Sometimes, the delta can be sufficient to warrant a swap when the delta is of great magnitude over fewer, consecutive days. Duration, magnitude, and/or consistency of the deltas can be weighed in order to determine when a swap is warranted.

As shown in FIG. 4A, the pick area management computer system 104 can receive a replenishment or swap opportunity for a static bay having a current SKU of SKU B (step A, 402) (e.g., refer to block 302 in FIG. 3). In other words, the static bay having SKU B currently has an inventory of SKU B that is below a threshold level. Therefore, there is an opportunity to replenish the static bay with more quantity of SKU B or to fill that quantity with another SKU.

The pick area management computer system 104 can then receive historic information for SKUs A and B (step B, 404) (e.g., refer to block 302 in FIG. 3). As described in reference to the process 300 in FIG. 3, the historic information can be received at a same time as the indication of the replenishment or swap opportunity for the static bay having SKU B (step A, 402). The historic information can also be retrieved from a warehouse data store and/or received from a warehouse management system (WMS) after receiving the indication of the replenishment or swap opportunity for the static bay.

In step B (404), the pick area management computer system 104 can receive the historic information for the current pallet SKU in the static bay (SKU B) as well as the historic information associated with any other pallet SKUs that can be swapped into the static bay. In the example of FIG. 4A, pallet SKU A can be swapped into the static bay. One or more other pallet SKUs can be swapped into the static bay in other scenarios.

Moreover, the received historic information can include average daily pick rates, maximum daily pick rates, demand, frequency of being picked (e.g., velocity), quantities requested in prior pick orders, storage location, weight per pallet, and other information that can be stored about the pallet SKUs in the warehouse data store.

Using the received historic information, the pick area management computer system 104 can determine trends in SKU A and B allocation over a predetermined time (step C, 406). The trends described in the process 400 correspond to the deviations described in the process 300 in FIG. 3. For example, using historic information about SKUs B and A, the pick area management computer system 104 determined SKU B graph 412 and SKU A graph 414. The graphs 412 and 414 depict how many bays have been allocated to the SKUs B and A over the predetermined time period of 5 days. This allocation of bays can be made by a computing system such as the pick area build computer system 102.

As shown in the SKU B graph 412, SKU B has been allocated 4 bays on day 1 and by day 5, SKU B was only allocated 2 bays. Thus, over the course of 5 days, SKU B was consistently assigned fewer bays in the pick area. On the other hand, SKU A was allocated 2 bays on day 1 and by day 3, SKU A was allocated 5 bays. SKU A was allocated 5 bays consistently for 3 days. Thus, over the course of 5 days, SKU A was consistently assigned more bays in the pick area. SKU B's decline in allocation can be based at least in part on SKU B being requested less in pick orders over the last 5 days. SKU A's increase in allocation, on the other hand, can be based at least in part on SKU A being requested more in pick orders over the last 5 days.

Once the pick area management computer system 104 determines trends in allocation for the SKUs A and B (step C, 406), it can be determined whether the SKU A trend meets a threshold condition to warrant swapping out SKU B with SKU A in the static bay (step D, 408) (e.g., refer to block 310 in FIG. 3). For example, as described in reference to the process 300 in FIG. 3, the threshold condition can be levels of magnitude and consistency in trend deviation over the predetermined time period. Magnitude of trend deviation can be represented by a sudden increase in the number of bays allocated to the SKU A. Consistency in trend deviation can be represented by the fact that a sudden increase in the number of bays allocated to the SKU A persisted over a predetermined number of days. The predetermined number of days can be the same as the predetermined time period. The predetermined number of days can also be a quantity of days within the predetermined time period.

In the example of FIG. 4A, the threshold condition for swapping can be at least a 50% increase in bay allocation over at least 2 of the 5 days. According to the SKU A graph 414, the SKU A experienced a 60% increase in bay allocation over 1 day, and this increase in bay allocation was maintained over 3 days. Therefore, SKU A exceeds or otherwise meets the threshold condition for swapping with SKU B in the static bay. Moreover, when comparing the allocation of SKU A to allocation of SKU B, it can be demonstrated that SKU B was allocated less bays over the period of time that SKU A was allocated more bays. Therefore, it can be preferred to make a determination by the pick area management computer system 104 that the SKU A trend meets the threshold condition for swapping with SKU B in the static bay.

Finally, the pick area management computer system 104 can return the indication that the SKU B can be replaced by or otherwise swapped out with SKU A (step E, 410). Refer to block 318 in FIG. 3 for further discussion.

FIG. 4B demonstrates graphical depictions of example replenishment and swap opportunities for the static bay in the pick area of FIG. 4A. Graphs 416, 418, 420, and 422 depict allocation trends for SKU B over a predetermined timeframe of 5 days. The graph 416 depicts a steady decline in allocation of SKU B in the static bay over the last 5 days. Since SKU B's allocation is consistently decreasing over the last 5 days, the pick area management system 104 can determine that the SKU B should be replaced with another SKU, such as SKU A, instead of replenishing SKU B. After all, a decline in allocation of SKU B of such magnitude (from 4 bays to 2 bays in 1 day) and consistency (the decline in allocation lasts 3 days) can indicate that SKU B's demand is decreasing overall. In other words, SKU B is being requested less in pick orders and therefore it can be preferred to begin transitioning the static bay from storing SKU B to another SKU that is being requested more. A swap can be warranted where the decline in allocation persists for the predetermined time period. In this example, the predetermined time period is 5 days. Thus, because the decline in allocation only persisted for 3 days, the pick area management system 104 can determine that, at the current time, the SKU B should just be replenished in the static bay rather than swapped out with another SKU.

The graph 418 depicts a steep yet constant decline in allocation of the SKU B. Over the course of the last 5 days, SKU B was routinely allocated 1 less bay a day. This decline in allocation can be of a big enough magnitude and consistency (SKU B went from 5 bays to 1 bay over 5 days) to warrant replacing or swapping SKU B with another SKU, such as SKU A.

The graph 420 depicts inconsistent deviations in allocation of the SKU B over the course of the last 5 days. Because the deviations in allocation are inconsistent, even if they are of sufficient magnitude, the deviations may not warrant replacing or swapping SKU B with another SKU. These deviations may be too unreliable to make such a determination that would cause a change in composition of the pick area. Since the deviations in SKU B's allocation are inconsistent, the pick area management system 104 can determine that replenishing SKU B in the static bay is a preferred decision at the current time. However, sometimes, a deviation in allocation can occur several times over the predetermined time period and still be considered significant enough to warrant swapping out SKU B with another SKU.

The graph 422 depicts a consistent deviation over 3 of the 5 days for SKU B's allocation of bays. Although the deviation can be consistent (approximately 4.5 bays each day for 3 days), the deviation may not be of significant enough magnitude to warrant swapping out SKU B with another SKU, such as SKU A. As shown in the graph 422, SKU B experienced a dip in allocation at day 2. Other than the dip in allocation on day 2, SKU B was consistently allocated approximately 4.5 bays.

Figure 5:
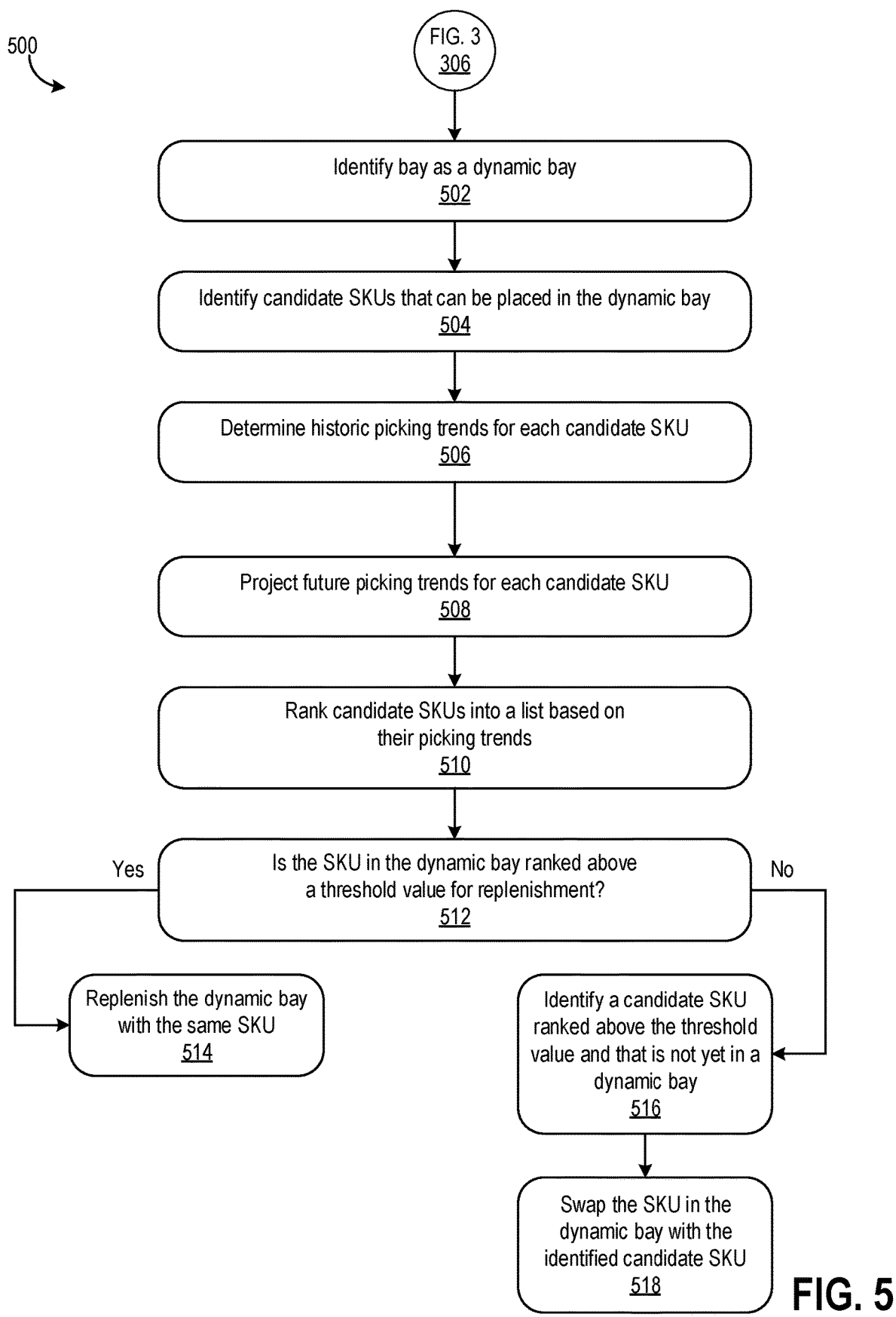
FIG. 5 is a flowchart of a process for determining whether to replenish or swap pallet SKUs in a dynamic bay in the pick area.

FIG. 5 is a flowchart of a process 500 for determining whether to replenish or swap pallet SKUs in a dynamic bay in the pick area. As described herein, dynamic bays are locations in the warehouse that can receive one or more different pallet SKUs depending on demand for such pallet SKUs during one or more time periods. For example, during summer months, pallets of ice cream can be projected to be in more demand than pallets of holiday decorations. Therefore, dynamic bays can be allocated to the pallets of ice cream during the summer months to accommodate for and to keep up with the increased demand for ice cream. Using the techniques described in reference to the process 500, dynamic bays can be replenished or swapped out with pallet SKUs that are projected to be in high demand in the near future.

The process 500 can be performed by the pick area management computer system 104 of FIG. 1. The process 500 can also be performed by one or more other computing systems, servers, devices, and/or network of computers. For illustrative purposes, the process 500 is described from the perspective of a computer system.

Referring to the process 500 in FIG. 5, once the computer system determines that a bay having a replenishment or swap opportunity is not a static location (e.g., refer to block 306 in FIG. 3), the computer system can identify the bay as a dynamic bay in 502. Being a dynamic bay, the bay can be dynamically updated to receive different SKUs based on the SKUs' projected future demand.

The computer system can identify candidate SKUs that can be placed in the dynamic bay in 504. The candidate SKUs can include a SKU that is currently stored in the dynamic bay. The computer system can receive a list of candidate SKUs that, historically, have been placed in dynamic bays in the pick area. The candidate SKUs can already be identified, such as by the pick area build computer system 102 and/or a warehouse management system (WMS). The computer system can then retrieve the list of candidate SKUs. The list of candidate SKUs can also be determined based on current demand of the SKUs. For example, the list of candidate SKUs can include SKUs that are currently requested in one or more pick orders that are received by the WMS. In yet some implementations, the candidate SKUs can include any SKUs that satisfy one or more conditions associated with the dynamic bay, such as a size or dimensions of the dynamic bay, size or dimensions of available space in the dynamic bay, temperature of the dynamic bay, how much weight can be supported in the dynamic bay, etc.

The computer system can also determine historic picking trends for each of the candidate SKUs (506). For example, once the candidate SKUs are identified, the computer system can retrieve from a warehouse data store historic information about each of the candidate SKUs. The historic information can include historic picking trends and can also include average daily picking rates over a predetermined period of time, maximum daily picking rates, and/or historic pick order requests that included the candidate SKUs. The computer system can receive historic information and can generate the historic picking trends based on the historic information. For example, the computer system can generate graphs that depict picking trends for each of the candidate SKUs over the predetermined period of time.

Figure 6A:
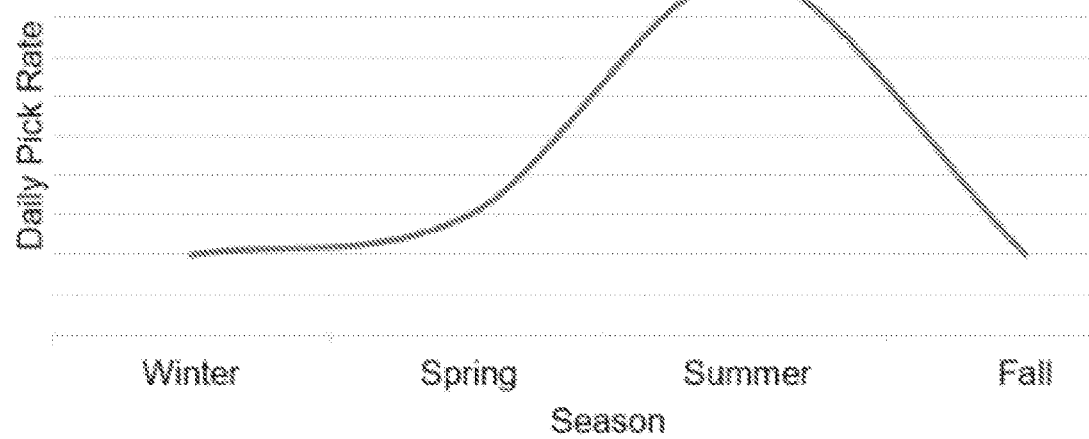
FIG. 6A demonstrates graphical depictions of example historic trends that can be used to determine which pallet SKU to position in a dynamic bay in the pick area.
Figure 6A:
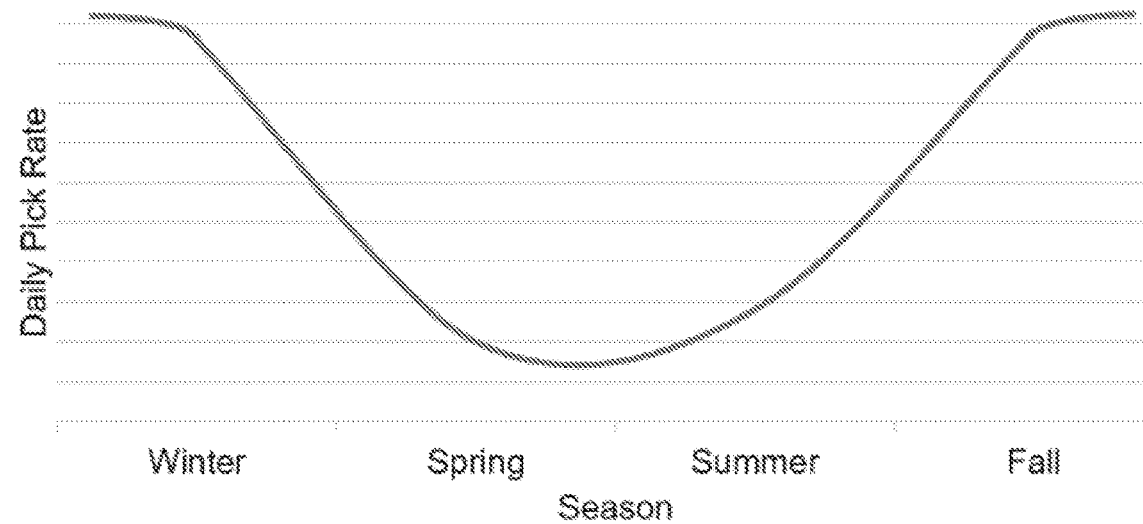
Figure 6B:
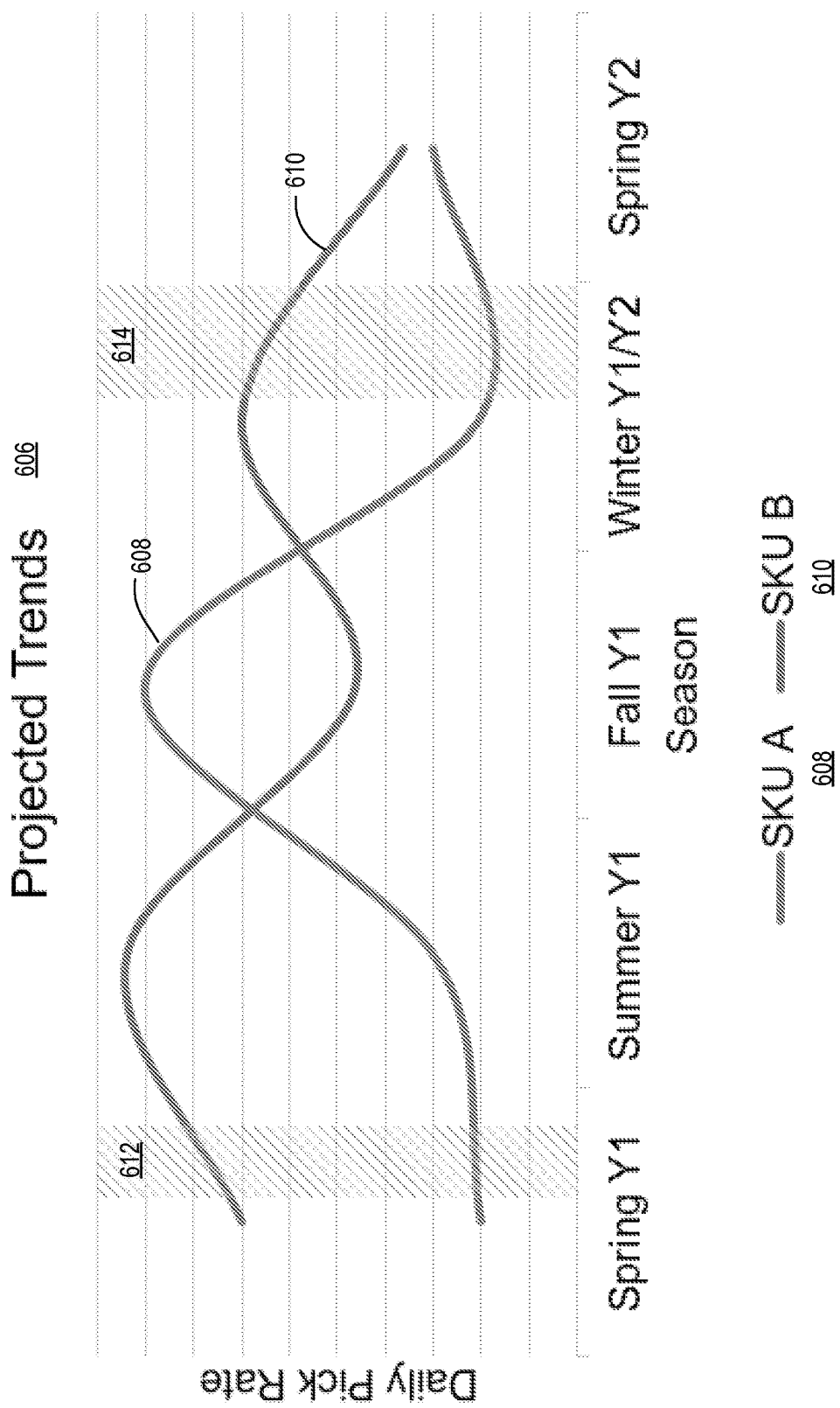
FIG. 6B is a graphical depiction of additional example projected future trends that can be used to determine what pallet SKU to position in the dynamic bay in the pick area.

Based on the historic picking trends, the computer system can project future picking trends for each of the candidate SKUs in 508. Thus, the computer system can perform a short term and a long term look back of historic picking trends in order to predict demand for each candidate SKU in the near future. For example, the computer system can look back 12 to 11 months from a current time period to project trending demand for the SKU at the current time period. The computer system can also look back to 3 to 1 months from the current time period to determine whether the SKU is currently trending and/or on a decline in demand. These look backs can be beneficial to project future trends, especially since the computer system may not receive pick order requests in advance of when the pick order requests are made. Refer to FIGS. 6A-B for further discussion on projecting future trends.

The computer system can rank the candidate SKUs into a list based on their picking trends (510). For example, the candidate SKUs can be ranked based on their historic and projected future picking trends. The candidate SKUs can also be ranked based on one of the historic and projected future picking trends. The computer system can rank the candidate SKUs based on only their projected future picking trends. Thus, the computer system can determine which candidate SKUs are most likely to be in high demand in the near future or at the current time period and which candidate SKUs are least likely to be in high demand.

The computer system can then determine whether a SKU currently in the dynamic bay or otherwise assigned to the dynamic bay is ranked above a threshold value for replenishment (512). As mentioned above, the candidate SKUs can include the SKU that is currently assigned to the dynamic bay. Therefore, the computer system can project future picking trends for the current SKU as well as all the other candidate SKUs. If the current SKU is ranked above the threshold value, then the current SKU is likely to remain in high demand and/or increase in demand at the current time and/or in the near future. Since demand for the current SKU would remain high and/or increase, the current SKU can remain in the dynamic bay. Keeping the current SKU in the dynamic bay can be advantageous to ensure that the warehouse can keep up with demand for the current SKU and efficiently complete pick orders that request quantities of the current SKU for the current time and/or in the near future. If, on the other hand, the current SKU is ranked below the threshold value, then the current SKU is likely to lower in demand at the current time and/or in the near future. Since demand for the current SKU may decrease, it can be preferred to fill the dynamic bay with another of the candidate SKUs that is ranked above the threshold value and/or above the current SKU.

Accordingly, if the current SKU is ranked above the threshold value, then the computer system can make a determination to replenish the dynamic bay with the same SKU in 514. As mentioned above, it can be preferred to keep the same SKU in the dynamic bay to keep up with continued high demand and/or increasing demand for that SKU at the current time and/or in the near future.

If the current SKU is not ranked above the threshold value, then the computer system can identify a candidate SKU that is ranked above the threshold value and that is not already in a dynamic bay in the pick area (516). For example, if one of the candidate SKUs is projected to increase in demand in the near future but that candidate SKU is already slotted to be positioned in one or more dynamic bays in the pick area, then the selected dynamic bay can be assigned another candidate SKU that also is projected to increase in demand. After all, the dynamic bays in the pick area can be filled with as many SKUs that are projected to be in high demand at the current time and/or the near future. By diversifying which SKUs of high demand fill the dynamic bays, the warehouse can more efficiently fulfill pick order requests on time. If, on the other hand, dynamic bays in the pick area are only filled with some candidate SKUs that are projected to increase in demand in the near future, then warehouse workers may resort to cherry picking or other time-consuming picking tasks in order to ensure that all SKUs that are requested in pick orders are actually picked.

The computer system can make a determination to swap the current SKU in the dynamic bay with the identified candidate SKU in 518. In other words, the candidate SKU that is identified as being ranked above the threshold value and/or above the current SKU can be designated as the SKU to be positioned in the dynamic bay.

The threshold value described in reference to the process 500 can be any value indicating a level of demand that would warrant positioning of the candidate SKU in the dynamic bay. That value can be based on characteristics of the warehouse environment, arrangement of the pick area, and/or historic information about the candidate SKUs. The threshold value can also be a percent increase in projected future demand for the candidate SKU. For example, the threshold value can be a 20%, 25%, 30%, 35%, 40%, 45%, 50%, etc. increase in projected future demand from a current level of demand for the candidate SKU. One or more other threshold values can be realized and used in the process 600.

FIG. 6A demonstrates graphical depictions of example historic trends that can be used to determine which pallet SKU to position in a dynamic bay in the pick area. As described throughout this disclosure (e.g., refer to the process 500 in FIG. 5), a computer system, such as the pick area management computer system 104, can look back over one or more historic time periods in order to project how particular pallet SKUs will trend in the future.

As shown in FIG. 6A, the historic look back is based on a seasonal basis. As described throughout this disclosure, the look back can be based on one or more different time periods, such as daily, monthly, seasonal, quarterly, yearly, etc. In the examples of FIG. 6A, the look back is measured over seasons, and the current time period is spring.

SKU A represents items of ice cream. SKU B represents turkey. Since the current time period is spring, the computer system can be looking forward to project future demand for SKUs A and B during a next season, which can be summer. The computer system can determine historic picking trends for SKUs A and B (e.g., refer to block 508 in FIG. 5). SKU A has a historic trend 602 and SKU B has a historic trend 604. SKU B can currently be located in a dynamic bay, and that dynamic bay can have a replenishment or swap opportunity (e.g., refer to block 502 in FIG. 5). The computer system can identify SKU A has one of one or more candidate SKUs that can be placed in the dynamic bay (e.g., refer to block 504 in FIG. 5). The determined historic trends 602 and 604 can be used by the computer system to project future picking trends for both SKUs A and B (e.g., refer to block 510 in FIG. 5 and FIG. 6B).

As shown, the SKU B historic trend 604 demonstrates that over the past year, between spring and summer, SKU B had its lowest daily pick rate. SKU B peaked between fall and winter seasons, which aligns with national holidays and demand for turkey during those holidays. On the other hand, the SKU A historic trend 602 demonstrates that over the past year, demand for SKU A, which is ice cream, increased between spring and summer and peaked during the summer. SKU A had its highest average daily pick rate during the summer season. Therefore, demand for SKU A aligns with the seasons and, just like SKU B. As mentioned throughout, the computer system can use trends depicted by the SKU A historic trend 602 and the SKU B historic trend 604 to project that over the upcoming months in the summer season, ice cream, or SKU A, will be in higher demand than turkey, SKU B. Thus, the computer system can make a determination that SKU A should replace (e.g., swap) SKU B in the dynamic bay that has low inventory of SKU B.

FIG. 6B is a graphical depiction of additional example projected future trends that can be used to determine what pallet SKU to position in the dynamic bay in the pick area. Here, the computer system can identify projected trends 606 for two SKUs A and B. Trend line 608 represents SKU A and trend line 610 represents SKU B. The projected trends 606 can be based on historic daily picking rates for a past 2 years, starting with a look back in early spring of year 1 during time period 612 and another look back in a beginning of winter of year 2 during time period 614. Using the time periods 612 and 614, the computer system can project or otherwise extend the trend lines 608 and 610 from where they end at spring of year 2 in the projected trends 606 graph.

The computer system can look back to at least the last 2 months as well as 9 to 12 months back from a current time period, such as where the trend lines 608 and 610 end in the projected trends 606 graph. The computer system can also look back over one or more other time periods. For example, the computer system can analyze historic trends over several years.

In the example of FIG. 6B, SKU A's daily pick rate peaked during fall of year 1 and dipped to its lowest during spring of year 1, during the time period 612, and also during winter of years 1 and 2, during the time period 614. SKU B's daily pick rate, on the other hand, increased during spring of year 1, the time period 612, dipped during fall of year 1, and then increased again during a beginning of the winter of year 1, before the time period 614. Based on these historic trends, the computer system can project that between spring of year 2 and summer of year 2, SKU A's daily pick rate likely will remain low and that the SKU A's daily pick rate may peak in the fall of year 2. The computer system may predict that SKU B will continue to peak and dip between spring of year 2 and summer of year 2. However, the computer system may look back over multiple years in this example in order to more accurately project the future trends for the trend line 610 of SKU B.

Based on the projected trends 606, the computer system can determine that SKU A should be positioned in a dynamic bay having low inventory. If the dynamic bay has low inventory of SKU A, then the computer system can determine that SKU A should be replenished therein. If the dynamic bay has low inventory of SKU B, then the computer system can determine that SKU B can be replaced or otherwise swapped with SKU A.

Figure 7:
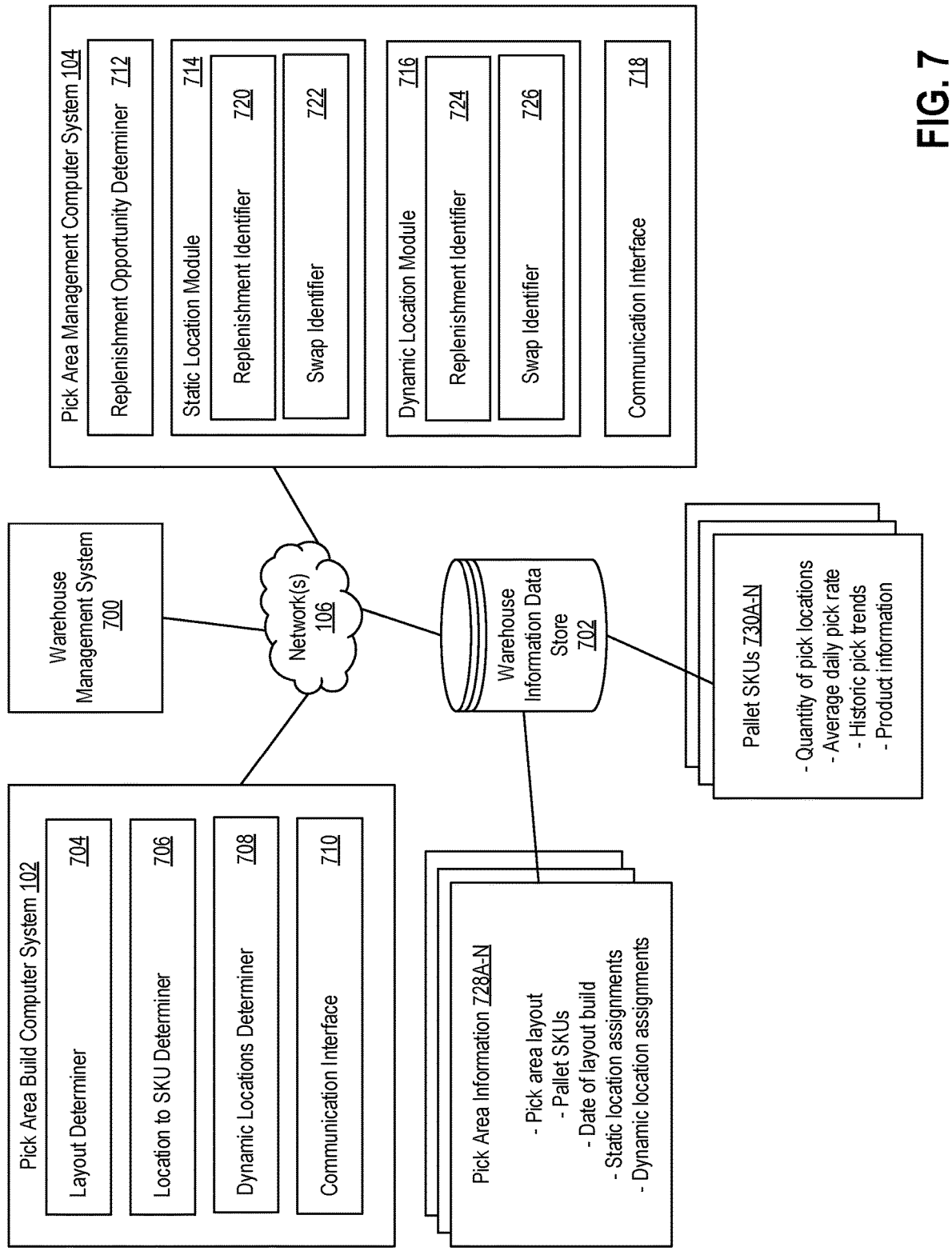
FIG. 7 is a system diagram of one or more computer components that can be used to perform the techniques described herein.

FIG. 7 is a system diagram of one or more computer components that can be used to perform the techniques described herein. The pick area build computer system 102 and the pick area management computer system 104 can be in communication (e.g., wired and/or wireless) via the network(s) 106. The computer systems 102 and 104 can also communicate with a warehouse management system (WMS) 700 and a warehouse information data store 702 via the network(s) 106. One or more of the computer systems 102 and 104 and/or the WMS 700 can be a central computer, computing system, and/or server. In other implementations, as depicted in FIG. 7, the computer systems 102 and 104 and/or the WMS 700 can be separate computers, computing systems, devices, and/or servers that are in communication with each other via the network(s) 106.

The pick area build computer system 102 can be configured to determine an optimal layout of the pick area of a warehouse environment. The optimal layout can be based on historic information about pallet SKUs in the warehouse as well as other information about historic and current states of the warehouse. The pick area build computer system 102 can include a layout determiner 704, a location to SKU determiner 706, a dynamic locations determiner 708, and a communication interface 710.

The layout determiner 704 can be configured to determine an optimal arrangement of the pick area in the warehouse environment. For example, the layout determiner 704 can identify a preferred number of aisles to have in the pick area and/or how long to make the aisle(s) in the pick area. The layout determiner 704 can also be configured to determine how many dynamic bays to slot in the pick area. Such determinations can be made using historic information that can be stored in and retrieved from the warehouse information data store 702. The layout determiner 704 can also receive information about past and current states of the warehouse from the WMS 700 to determine an optimal arrangement of the pick area. The layout determiner 704 can, for example, generate one or more different arrangements for the pick area, then simulate fulfilling pick orders in each of those arrangements in order to identify which arrangement is most optimal. The layout determiner 704 can use historic pick order requests and pallet SKUs information to simulate pick order fulfillment in each of the arrangements.

The location to SKU determiner 706 can be configured to determine where to position SKUs in the pick area. For example, the determiner 706 can receive the optimal layout arrangement from the layout determiner 704. The location to SKU determiner 706 can also retrieve pallet SKUs information 730A-N from the warehouse information data store 702 and use this information to identify (1) which SKUs to position in the pick area (e.g., SKUs that are currently in demand and/or have average daily pick rates that exceed some threshold condition), (2) whether to position the SKUs in static or dynamic bays, (3) how many bays to allocate to each SKU (e.g., based on historic trends in demand), whether to group bays of the same SKU (e.g., based on historic trends in quantity picked per pick order request), and/or (4) where along the pick aisles to position each SKU (e.g., towards a front end for heavier or more in-demand SKUs or a back end of a pick aisle for lighter weight, less in-demand SKUs).

The pallet SKUs information 730A-N can include quantity of pick locations, average daily pick rates, historic pick trends, and/or product information. The pallet SKU's information 730A-N can be stored in the warehouse information data store 702 and can be updated over time based on information that is inputted and/or received at the WMS 700. This information can be used in determining the layout of the pick area via the layout determiner 704 and/or the SKU allocations via the location to SKU determiner 706.

The dynamic locations determiner 708 can be configured to identify, at an initial time, which pallet SKUs can be positioned in the dynamic locations that are allotted to the pick area. The dynamic locations determiner 708 can also identify or otherwise determine preferred locations to position the dynamic bays in the pick area. The dynamic locations determiner 708 can make such determinations using the pallet SKUS information 730A-N that can be retrieved from the warehouse information data store 702. The dynamic locations determiner 708 can also receive information from the WMS 700 and use that to make the determinations described herein.

Determinations made by the pick area build computer system 102 can be stored as pick area information 728A-N in the warehouse information data store 702. The pick area information 728A-N can include a pick area layout, pallet SKUs, date of layout build, static location assignments, and dynamic location assignments. The pick area information 728A-N can include one or more additional and/or fewer pieces of information. Moreover, the pick area information 728A-N can be updated overtime, whenever new information is received by the WMS 700 and/or whenever the pick area build computer system 102 makes a determination with regards to optimal layout and arrangement of the pick area.

The pick area management computer system 104, as described throughout this disclosure, can determine when a replenishment or swap opportunity arises in a location, or bay, in the pick area, and whether to replenish or swap pallet SKUs in that location. The pick area management computer system 104 can have one or more modules, including but not limited to a replenishment opportunity determiner 712, a static location module 714, a dynamic location module 716, and a communication interface 718.

The replenishment opportunity determiner 712 can be configured to determine when a location in the pick area has low inventory of a particular pallet SKU. The replenishment opportunity determiner 712 can therefore identify when the location either has an opportunity to be replenished with the same pallet SKU or replaced with a different SKU. Refer to the process 200 in FIG. 2 for further discussion. The replenishment opportunity determiner 712 can also identify whether the location having low inventory is a static location or a dynamic location. The replenishment opportunity determiner 712 can receive indications of stock levels from the WMS 700. The replenishment opportunity determiner 712 can also retrieve indications of stock levels from the warehouse information data store 702.

The static location module 714 can be configured to make replenishment and/or swap determinations for locations in the pick area having low inventory that are classified as static locations. The static location module 714 can have a replenishment identifier 720 and a swap identifier 722. Accordingly, the static location module 714 can retrieve, from the warehouse information data store 702, the pick area information 728A-N and the pallet SKUs information 730A-N. Using this information, the static location module 714 can determine whether the static location shall be replenished with a same pallet SKU or whether the static location should be swapped with a new pallet SKU. The static location module 714 can review historic pick trends from the retrieved pallet SKUs information 730A-N in order to determine whether a current pallet SKU's demand satisfies replenishment conditions. The static location module 714 can also review information about the pick area (e.g., the pick area information 728A-N) in order to determine which pallet SKUs are candidates for placement in the static location. For example, candidate pallet SKUs can be identified based on the layout of the pick area, whether the candidate pallet SKUs are currently positioned in the pick area layout and/or have been positioned in the pick area layout before, how many locations each of the candidate pallet SKUs have been assigned in the pick area, and/or whether the candidate pallet SKUs have been assigned static or dynamic locations.

If, for example, another pallet SKU experiences changes in demand that satisfy consistency and/or magnitude threshold conditions, then the static location module 714, and, more specifically, the swap identifier 722, can determine that the current pallet SKU should be replaced or swapped with the other pallet SKU. Determinations made by the static location module 714 can be stored in the warehouse information data store 702 in the pallet SKUs information 730A-N. These determinations can also be transmitted to the WMS 700 to be reviewed by one or more warehouse workers. Refer to FIGS. 3-4 for further discussion.

The dynamic location module 716 can be configured to make replenishment and/or swap determinations for locations in the pick area having low inventory that are classified as dynamic locations. The dynamic location module 716 can have a replenishment identifier 724 and a swap identifier 726. Accordingly, the dynamic location module 716 can retrieve, from the warehouse information data store 702, the pick area information 728A-N and the pallet SKUs information 730A-N. Using this information, the dynamic location module 716 can determine whether the dynamic location shall be replenished with a same pallet SKU or whether the dynamic location should be swapped with a new pallet SKU. The dynamic location module 716 can review historic pick trends from the retrieved pallet SKUs information 730A-N in order to project future demand for a current pallet SKU and one or more candidate pallet SKUs that can be positioned in the dynamic location. The dynamic location module 716 can also review information about the pick area (e.g., the pick area information 728A-N) in order to determine which pallet SKUs are candidates for placement in the dynamic location. For example, candidate pallet SKUs can be identified based on whether the candidate pallet SKUs are currently positioned in the pick area layout and/or have been positioned in the pick area layout before, how many locations each of the candidate pallet SKUs have been assigned in the pick area, and/or whether the candidate pallet SKUs have been assigned static or dynamic locations. Pallet SKUs that have already been assigned to dynamic locations in the pick area may, for example, not be identified as candidate pallet SKUs for the dynamic location having low inventory.

Accordingly, based on analysis of historic picking trends and projection of future picking trends, the replenishment identifier 724 can determine when the current pallet SKU in the dynamic location can be replenished. The swap identifier 726 can determine when the current pallet SKU In the dynamic location can be swapped with another pallet SKU. For example, the swap identifier 726 can determine that the dynamic location having low inventory should be swapped with another pallet SKU when the another pallet SKU is projected to be in high demand within or shortly after a current time period. As a result, the dynamic location can be updated to accommodate for increased and changing demand in pallet SKUs. Refer to FIGS. 5-6 for further discussion.

The communication interfaces 710 and 718 can be configured to provide for communication between one or more of the components described herein.

Figure 8:
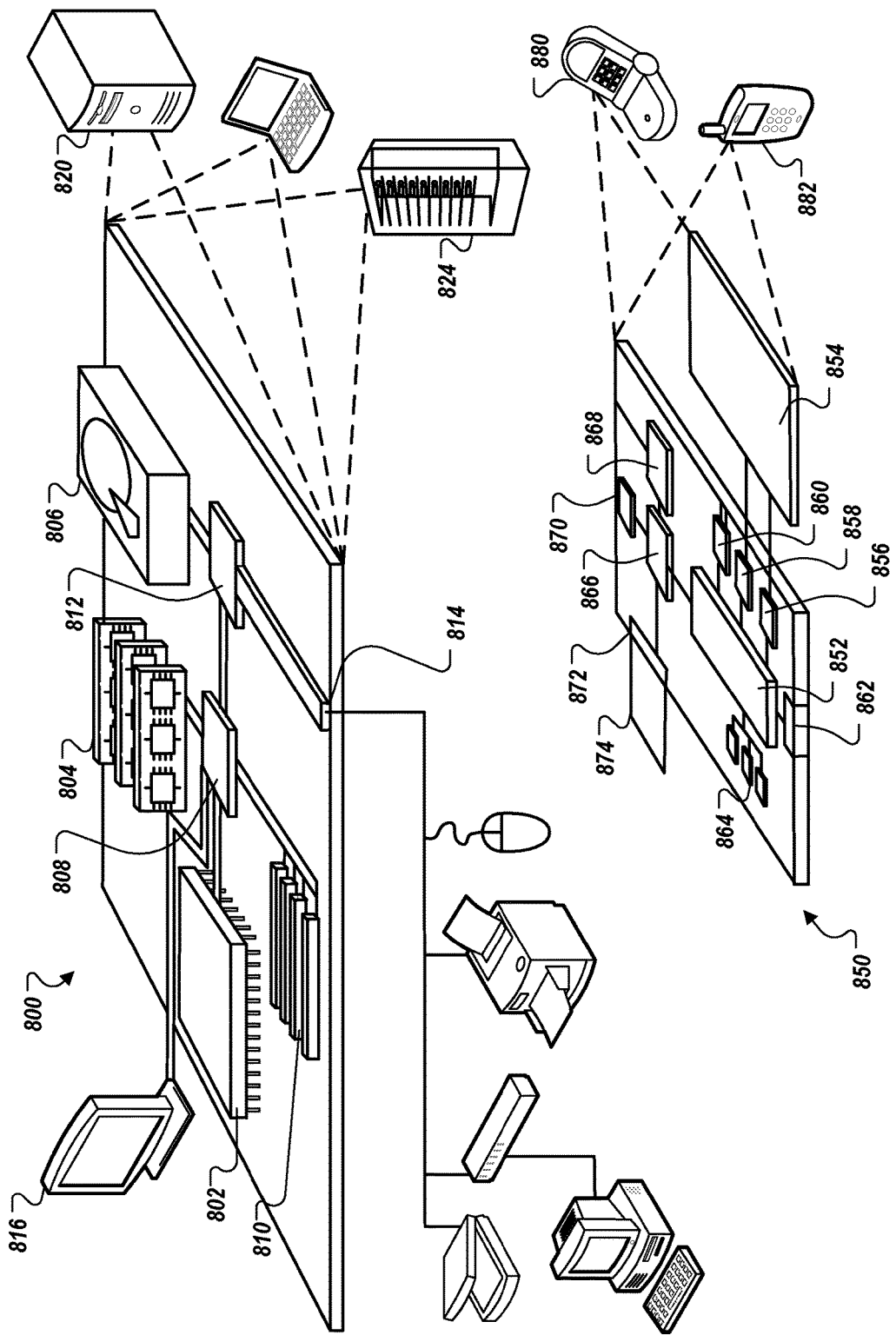
FIG. 8 is a schematic diagram that shows an example of a computing device and a mobile computing device.

FIG. 8 shows an example of a computing device 800 and an example of a mobile computing device that can be used to implement the techniques described here. The computing device 800 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 800 includes a processor 802, a memory 804, a storage device 806, a high-speed interface 808 connecting to the memory 804 and multiple high-speed expansion ports 810, and a low-speed interface 812 connecting to a low-speed expansion port 814 and the storage device 806. Each of the processor 802, the memory 804, the storage device 806, the high-speed interface 808, the high-speed expansion ports 810, and the low-speed interface 812, are interconnected using various busses, and can be mounted on a common motherboard or in other manners as appropriate. The processor 802 can process instructions for execution within the computing device 800, including instructions stored in the memory 804 or on the storage device 806 to display graphical information for a GUI on an external input/output device, such as a display 816 coupled to the high-speed interface 808. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 804 stores information within the computing device 800. In some implementations, the memory 804 is a volatile memory unit or units. In some implementations, the memory 804 is a non-volatile memory unit or units. The memory 804 can also be another form of computer-readable medium, such as a magnetic or optical disk.

The storage device 806 is capable of providing mass storage for the computing device 800. In some implementations, the storage device 806 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 804, the storage device 806, or memory on the processor 802.

The high-speed interface 808 manages bandwidth-intensive operations for the computing device 800, while the low-speed interface 812 manages lower bandwidth-intensive operations. Such allocation of functions is exemplary only. In some implementations, the high-speed interface 808 is coupled to the memory 804, the display 816 (e.g., through a graphics processor or accelerator), and to the high-speed expansion ports 810, which can accept various expansion cards (not shown). In the implementation, the low-speed interface 812 is coupled to the storage device 806 and the low-speed expansion port 814. The low-speed expansion port 814, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 800 can be implemented in a number of different forms, as shown in the figure. For example, it can be implemented as a standard server 820, or multiple times in a group of such servers. In addition, it can be implemented in a personal computer such as a laptop computer 822. It can also be implemented as part of a rack server system 824. Alternatively, components from the computing device 800 can be combined with other components in a mobile device (not shown), such as a mobile computing device 850. Each of such devices can contain one or more of the computing device 800 and the mobile computing device 850, and an entire system can be made up of multiple computing devices communicating with each other.

The mobile computing device 850 includes a processor 852, a memory 864, an input/output device such as a display 854, a communication interface 866, and a transceiver 868, among other components. The mobile computing device 850 can also be provided with a storage device, such as a micro-drive or other device, to provide additional storage. Each of the processor 852, the memory 864, the display 854, the communication interface 866, and the transceiver 868, are interconnected using various buses, and several of the components can be mounted on a common motherboard or in other manners as appropriate.

The processor 852 can execute instructions within the mobile computing device 850, including instructions stored in the memory 864. The processor 852 can be implemented as a chipset of chips that include separate and multiple analog and digital processors. The processor 852 can provide, for example, for coordination of the other components of the mobile computing device 850, such as control of user interfaces, applications run by the mobile computing device 850, and wireless communication by the mobile computing device 850.

The processor 852 can communicate with a user through a control interface 858 and a display interface 856 coupled to the display 854. The display 854 can be, for example, a TFT (Thin-Film-Transistor Liquid Crystal Display) display or an OLED (Organic Light Emitting Diode) display, or other appropriate display technology. The display interface 856 can comprise appropriate circuitry for driving the display 854 to present graphical and other information to a user. The control interface 858 can receive commands from a user and convert them for submission to the processor 852. In addition, an external interface 862 can provide communication with the processor 852, so as to enable near area communication of the mobile computing device 850 with other devices. The external interface 862 can provide, for example, for wired communication in some implementations, or for wireless communication in other implementations, and multiple interfaces can also be used.

The memory 864 stores information within the mobile computing device 850. The memory 864 can be implemented as one or more of a computer-readable medium or media, a volatile memory unit or units, or a non-volatile memory unit or units. An expansion memory 874 can also be provided and connected to the mobile computing device 850 through an expansion interface 872, which can include, for example, a SIMM (Single In Line Memory Module) card interface. The expansion memory 874 can provide extra storage space for the mobile computing device 850, or can also store applications or other information for the mobile computing device 850. Specifically, the expansion memory 874 can include instructions to carry out or supplement the processes described above, and can include secure information also. Thus, for example, the expansion memory 874 can be provide as a security module for the mobile computing device 850, and can be programmed with instructions that permit secure use of the mobile computing device 850. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 864, the expansion memory 874, or memory on the processor 852. In some implementations, the computer program product can be received in a propagated signal, for example, over the transceiver 868 or the external interface 862.

The mobile computing device 850 can communicate wirelessly through the communication interface 866, which can include digital signal processing circuitry where necessary. The communication interface 866 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 868 using a radio-frequency. In addition, short-range communication can occur, such as using a Bluetooth, WiFi, or other such transceiver (not shown). In addition, a GPS (Global Positioning System) receiver module 870 can provide additional navigation- and location-related wireless data to the mobile computing device 850, which can be used as appropriate by applications running on the mobile computing device 850.

The mobile computing device 850 can also communicate audibly using an audio codec 860, which can receive spoken information from a user and convert it to usable digital information. The audio codec 860 can likewise generate audible sound for a user, such as through a speaker, e.g., in a handset of the mobile computing device 850. Such sound can include sound from voice telephone calls, can include recorded sound (e.g., voice messages, music files, etc.) and can also include sound generated by applications operating on the mobile computing device 850.

The mobile computing device 850 can be implemented in a number of different forms, as shown in the figure. For example, it can be implemented as a cellular telephone 880. It can also be implemented as part of a smart-phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A method for determining swap and replenishment opportunities in a pick area of a storage facility, the method comprising:
   receiving, by a computer system, current stock levels for bays in the pick area;
   identifying, by the computer system, a subset of the bays as having a replenishment or swap opportunity based on determining that the current stock levels for the subset of the bays is less than a threshold stock level;
   determining, by the computer system and for each bay in the subset of the bays, whether the bay is a static bay or a dynamic bay, wherein (i) the bay is a static bay based on determining that the bay is assigned product SKUs that are frequently and consistently picked over a period of time and (ii) the bay is a dynamic bay based on determining that the bay is assigned product SKUs that fluctuate in demand and volume on a day-to-day basis; and
   for each bay in the subset of the bays that is determined to be a dynamic bay:
      retrieving, by the computer system and from a data store, historic picking trends of candidate product SKUs that are stored in the store facility and can be placed in the dynamic bay, wherein the historic picking trends for the candidate product SKUs correspond to a first time period,
      projecting, by the computer system and based on the historic picking trends for the candidate product SKUs over the first time period, future picking trends for at least one of the candidate product SKUs over a second time period,
      ranking, by the computer system, the candidate product SKUs into a list based on the future picking trends for the at least one of the candidate product SKUs,
      determining, by the computer system, whether the at least one of the candidate product SKUs is ranked above a predetermined threshold rank for replenishment of the dynamic bay at the current time period,
      based on the determination that the at least one candidate product SKUs is ranked above the predetermined threshold, identifying, by the computer system, a swapping opportunity to swap a quantity of the product SKUs assigned to the dynamic bay with a quantity of the at least one of the candidate product SKUs, wherein the quantity of the at least one of the candidate product SKUs is based on the quantities of the at least one of the candidate product SKUs that are projected to be picked according to the future picking trends,
      determining, by the computer system and based on the swapping opportunity, a physical arrangement of the subset of the bays in the pick area, wherein determining the physical arrangement comprises generating instructions to move the quantity of the at least one of the candidate product SKUs from respective storage locations in the storage facility to the dynamic bay, and
      executing, by the computer system, the instructions to move the quantity of the at least one of the candidate product SKUs from the respective storage locations in the storage facility to the dynamic bay to adjust the physical arrangement of the subset of the bays in the pick area.

2. The method of claim 1, further comprising:
   determining, by the computer system and based on whether the bay is a static bay, whether the bay has a swap opportunity or a replenishment opportunity.

3. The method of claim 1, wherein determining, by the computer system, whether each bay in the subset of the bays is a static bay comprises:
   receiving, from another computer system, pick area build information; and
   identifying, based on the pick area build information, that the bay is a static bay.

4. The method of claim 3, wherein the pick area build information includes a pick area layout, current SKUs in the pick area, date of layout build, static location assignments for the bays, and dynamic location assignments for the bays.

5. The method of claim 1, further comprising:
   determining, by the computer system, that the bay is a static bay;
   identifying, by the computer system, candidate SKUs that can be placed in the static bay;
   retrieving, by the computer system and from a data store, historic information for the candidate SKUs;
   determining, by the computer system and based on the historic information for each of the candidate SKUs, deviations in each of the candidate SKUs allocation in static bays over a predetermined time period;

determining, by the computer system, whether the deviations in each of the candidate SKUs allocation exceeds a threshold allocation level;

identifying, by the computer system, a swap opportunity for the static bay based on the deviation for one or more of the candidate SKUs exceeding the threshold allocation level;

identifying, by the computer system, a replenishment opportunity for the static bay based on the deviation being less than the threshold allocation level; and returning, by the computer system, the swap opportunity or the replenishment opportunity for the static bay.

6. The method of claim 1, wherein determining, by the computer system, whether each bay in the subset of the bays is a dynamic bay comprises:

receiving, from another computer system, pick area build information; and identifying, based on the pick area build information, that the bay is a dynamic bay.

7. The method of claim 1, further comprising:

determining, by the computer system, whether a current SKU in the dynamic bay is ranked above a threshold rank for replenishment of the dynamic bay;

identifying, by the computer system, a replenishment opportunity for the dynamic bay based on determining that the current SKU in the dynamic bay is ranked above the threshold rank;

identifying, by the computer system, a swap opportunity for the dynamic bay based on determining that the current SKU in the dynamic bay is ranked below the threshold rank; and returning, by the computer system, the swap opportunity or the replenishment opportunity for the dynamic bay.

8. The method of claim 1, wherein projecting, by the computer system and based on the historic picking trends, future picking trends for each of the candidate SKUs is based on an average daily pick rate for the candidate SKU over a third time period and a fourth time period.

9. The method of claim 8, wherein the third time period is between three and two months before a current time period and the fourth time period is between eleven and nine months before the current time period.

10. The method of claim 8, wherein the third time period is within a first threshold amount of time before a current time period and the fourth time period is within a second threshold amount of time before the current time period, wherein the first threshold amount of time is less than the second threshold amount of time.

11. The method of claim 5, wherein the historic information for the candidate SKUs includes, for each of the candidate SKUs, a quantity of pick locations in the pick area, an average daily pick rate, historic picking trends, and product information.

12. The method of claim 5, wherein the threshold allocation level is based on a combination of magnitude and consistency of the deviation for each of the candidate SKUs allocation, wherein the magnitude exceeds a threshold magnitude level over a third period of time before the current time period and the consistency exceeds a threshold duration level over a fourth period of time before the current time period.

13. A system for determining swap and replenishment opportunities in a pick area of a storage facility, the system comprising:

a pick area comprising a plurality of bays; and
a computer system configured to:

receive current stock levels for the bays in the pick area;

identify a subset of the bays as having a replenishment or swap opportunity based on determining that the current stock levels for the subset of the bays is less than a threshold stock level;

determine, for each bay in the subset of the bays, whether the bay is a static bay or a dynamic bay, wherein (i) the bay is a static bay based on determining that the bay is assigned product SKUs that are frequently and consistently picked over a period of time and (ii) the bay is a dynamic bay based on determining that the bay is assigned product SKUs that fluctuate in demand and volume on a day-to-day basis; and for each bay in the subset of the bays that is determined to be a dynamic bay:

retrieve, from a data store, historic picking trends of candidate product SKUs that are stored in the store facility and can be placed in the dynamic bay, wherein the historic picking trends for the candidate product SKUs correspond to a first time period, project, based on the historic picking trends for the candidate product SKUs over the first time period, future picking trends for at least one of the candidate product SKUs over a second time period, rank the candidate product SKUs into a list based on the future picking trends for the at least one of the candidate product SKUs, determine whether the at least one of the candidate product SKUs is ranked above a predetermined threshold rank for replenishment of the dynamic bay at the current time period, based on the determination that the at least one candidate product SKUs is ranked above the predetermined threshold, identify a swapping opportunity to swap a quantity of the product SKUs assigned to the dynamic bay with a quantity of the at least one of the candidate product SKUs, wherein the quantity of the at least one of the candidate product SKUs is based on the quantities of the at least one of the candidate product SKUs that are projected to be picked according to the future picking trends, determine, based on the swapping opportunity, a physical arrangement of the subset of the bays in the pick area, wherein determining the physical arrangement comprises generating instructions move the quantity of the at least one of the candidate product SKUs from respective storage locations in the storage facility to the dynamic bay, and execute the instructions to move the quantity of the at least one of the candidate product SKUs from the respective storage locations in the storage facility to the dynamic bay to adjust the physical arrangement of the subset of the bays in the pick area.

14. The system of claim 13, wherein the computer system is further configured to:

determine, based on whether the bay is a static bay, whether the bay has a swap opportunity or a replenishment opportunity.

15. The system of claim 14, wherein determining whether each bay in the subset of the bays is a static bay comprises:

receiving, from another computer system, pick area build information; and identifying, based on the pick area build information, that the bay is a static bay.

16. The system of claim 15, wherein the pick area build information includes a pick area layout, current SKUs in the pick area, date of layout build, static location assignments for the bays, and dynamic location assignments for the bays.

17. The system of claim 14, wherein the computer system is further configured to:
- identify candidate SKUs that can be placed in the static bay;
- retrieve, from a data store, historic information for the candidate SKUs;
- determine, based on the historic information for each of the candidate SKUs, deviations in each of the candidate SKUs allocation in static bays over a predetermined time period;
- determine whether the deviations in each of the candidate SKUs allocation exceeds a threshold allocation level;
- identify a swap opportunity for the static bay based on the deviation for one or more of the candidate SKUs exceeding the threshold allocation level;
- identify a replenishment opportunity for the static bay based on the deviation being less than the threshold allocation level; and
- return the swap opportunity or the replenishment opportunity for the static bay.

18. The method of claim 1, wherein determining the physical arrangement further comprises generating instructions to move the quantity of the product SKUs that are assigned to the dynamic bay from the dynamic bay to storage locations in the storage facility.

19. The method of claim 1, wherein the first time period is between one and twenty-four months before a current time period and the second time period is less than six months after the current time period.

20. The system of claim 13, wherein determining the physical arrangement further comprises generating instructions to move the quantity of the product SKUs that are assigned to the dynamic bay from the dynamic bay to storage locations in the storage facility.

* * * * *